United States Patent
Mori et al.

(10) Patent No.: US 7,804,797 B2
(45) Date of Patent: Sep. 28, 2010

(54) COMMUNICATION CONTROL DEVICE AND COMMUNICATION CONTROL METHOD

(75) Inventors: Shinichi Mori, Yokohama (JP);
Tomoyuki Ooya, Yokohama (JP);
Takatoshi Sugiyama, Yokohama (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 603 days.

(21) Appl. No.: 11/847,810

(22) Filed: Aug. 30, 2007

(65) Prior Publication Data
US 2008/0056177 A1 Mar. 6, 2008

(30) Foreign Application Priority Data
Aug. 31, 2006 (JP) .............................. 2006-236704

(51) Int. Cl.
H04B 7/18 (2006.01)
H04B 17/00 (2006.01)
H04Q 7/24 (2006.01)

(52) U.S. Cl. ....................... 370/318; 370/230; 370/338; 455/67.11

(58) Field of Classification Search ................. 370/230, 370/318, 329, 338, 347, 442, 445, 458, 468, 370/522; 455/522, 67.11, 127.1, 420
See application file for complete search history.

(56) References Cited

U.S. PATENT DOCUMENTS 6,978,151 B2 * 12/2005 Choi et al. .................. 455/522
7,130,653 B2 * 10/2006 Lin ............................. 455/522
7,388,849 B2 * 6/2008 Kim et al. ................... 370/329
7,415,262 B2 * 8/2008 Liu et al. ..................... 455/318

FOREIGN PATENT DOCUMENTS

WO WO 02/091623 A1 11/2002

(Continued)

OTHER PUBLICATIONS

Murad Abusubaih et al., "Inter-AP Coordination Protocols", TKN Telecommunication Networks Group, XP007903760, Berlin, Jul. 2006, pp. 1-45 including title page and abstract.

(Continued)

*Primary Examiner*—Afsar M. Qureshi
(74) *Attorney, Agent, or Firm*—Crowell & Moring LLP

(57) ABSTRACT

A communication control device is provided which efficiently utilizes wireless resources to improve communication quality and system throughput by appropriately setting and performing node transmission power. The communication control device in a wireless LAN system includes a sender 206, a receiver 207, and an inter-AP communication function 211 for determining, based on at least one of wireless information obtained by measurement of a wireless signal by an access point 103 or a station 104a, or reported wireless information, whether or not there is a neighboring BSS, and a transmission power determination function 210 and a transmission power setting/update function 205 for setting and updating the transmission power of the access point 103 and the station 104a in its own BSS when there is a neighboring BSS in which all the access point have the control function of the transmission power, on the other hand, for maximizing the transmission power when there is no neighboring BSS or when there is a neighboring BSS that does not control the transmission power.

20 Claims, 15 Drawing Sheets

FOREIGN PATENT DOCUMENTS

WO     WO 03/003657 A1     1/2003

OTHER PUBLICATIONS

Roger Durand, Spectrum Etiquette, (doc.: IEEE 802.11-05/0906r0), Sep. 17, 2005, slides 1-14, XP0079303767.

Andreas J. Koensgen et al., "Transmit Power Control Algorithms in IEEE 802.11h Based Networks", 2005 IEEE 16$^{th}$ International Symposium on Personal, Indoor and Mobile Radio Communications, pp. 1441-1445, XP010926640.

IEEE Standards 802.11h, "Standard for Information technology telecommunications and information exchange between systems Local and metropolitan area networks Specific requirements" XP-002292634, The Institute of Electrical and Electronics Engineers, Inc., Oct. 14, 2003.

European Search Report dated Jan. 11, 2008 (Nine (9) pages).

Duck-Yong Yang et al., "Achieving Efficient Channel Utilization Using Dynamic Coverage Control in IEEE 802.11", 2004, pp. 217-221, IEEE.

Hector Velayos et al., "Load Balancing in Overlapping Wireless LAN Cells", IEEE Communications Society, 2004, pp. 3833-3836, IEEE.

Olivia Brickley et al., "Load Balancing for QoS Optimisation in Wireless LANs Utilising Advanced Cell Breathing Techniques", 2005, pp. 1-5, IEEE.

\* cited by examiner

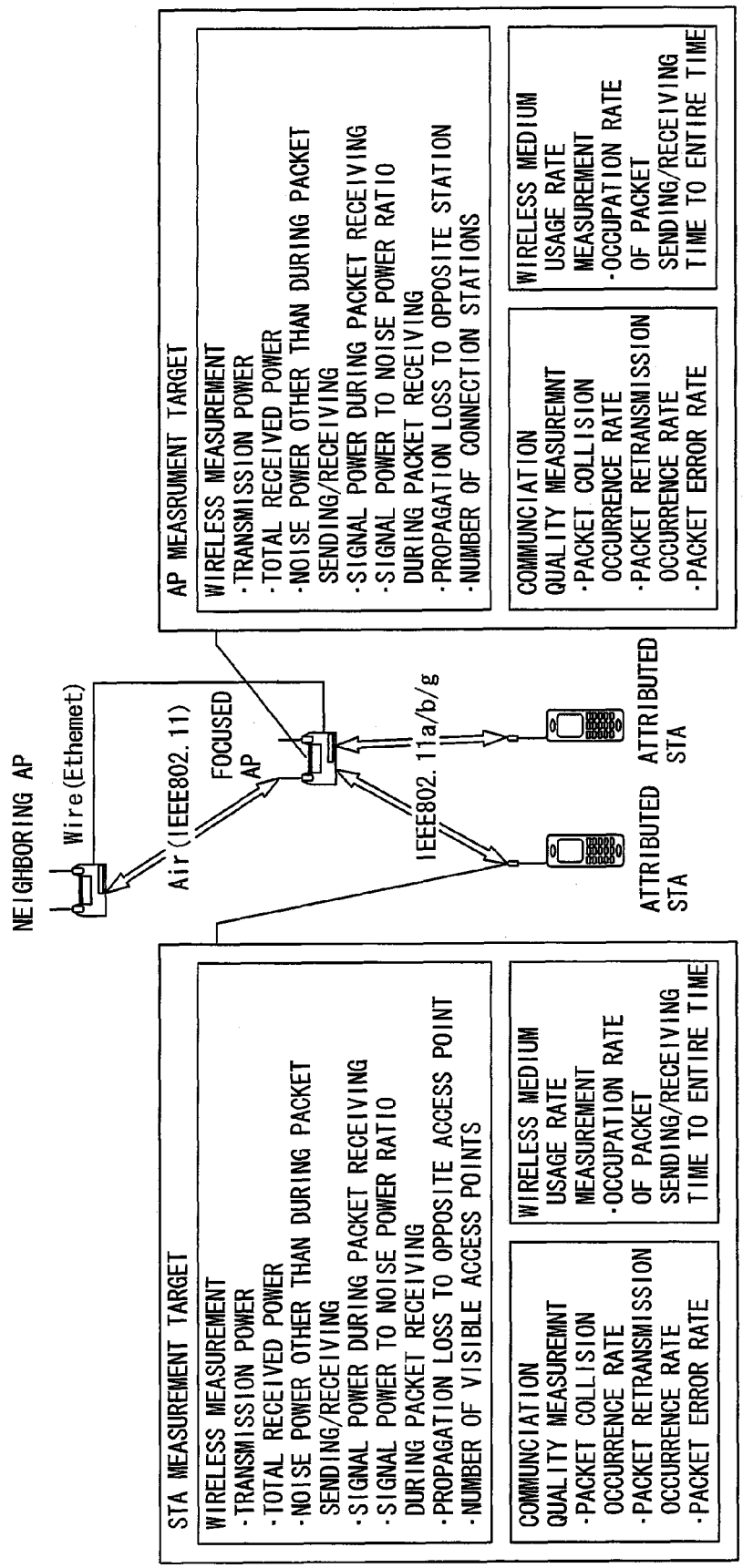

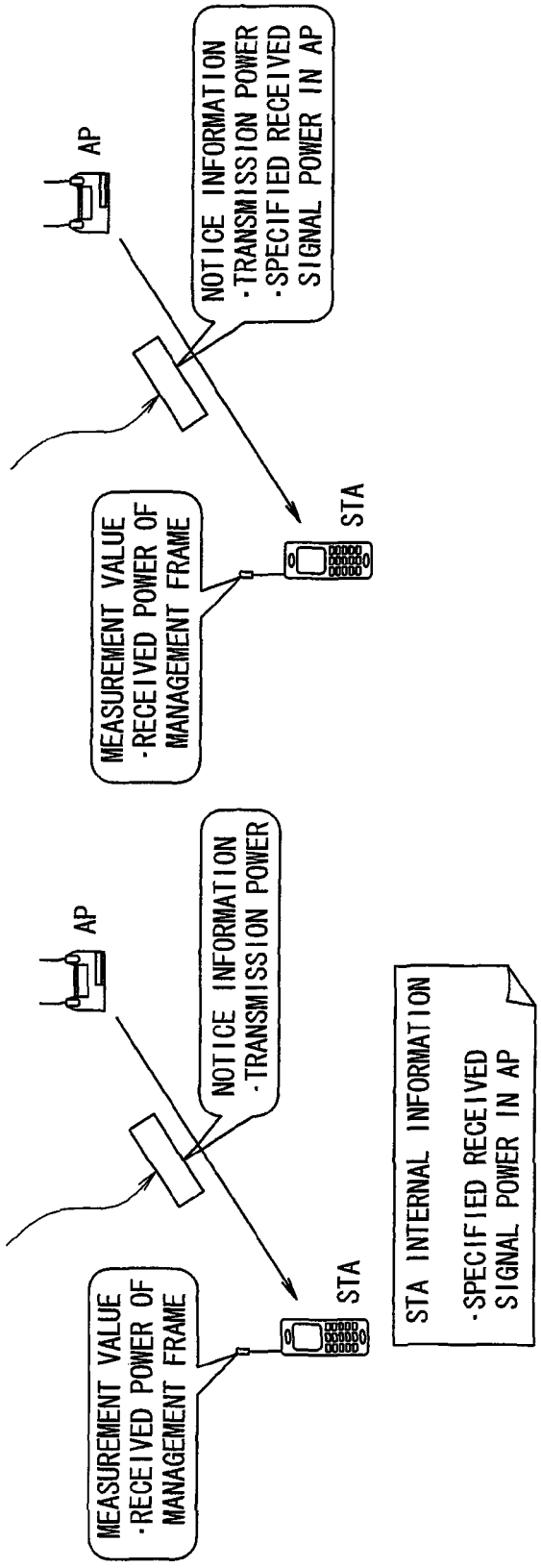

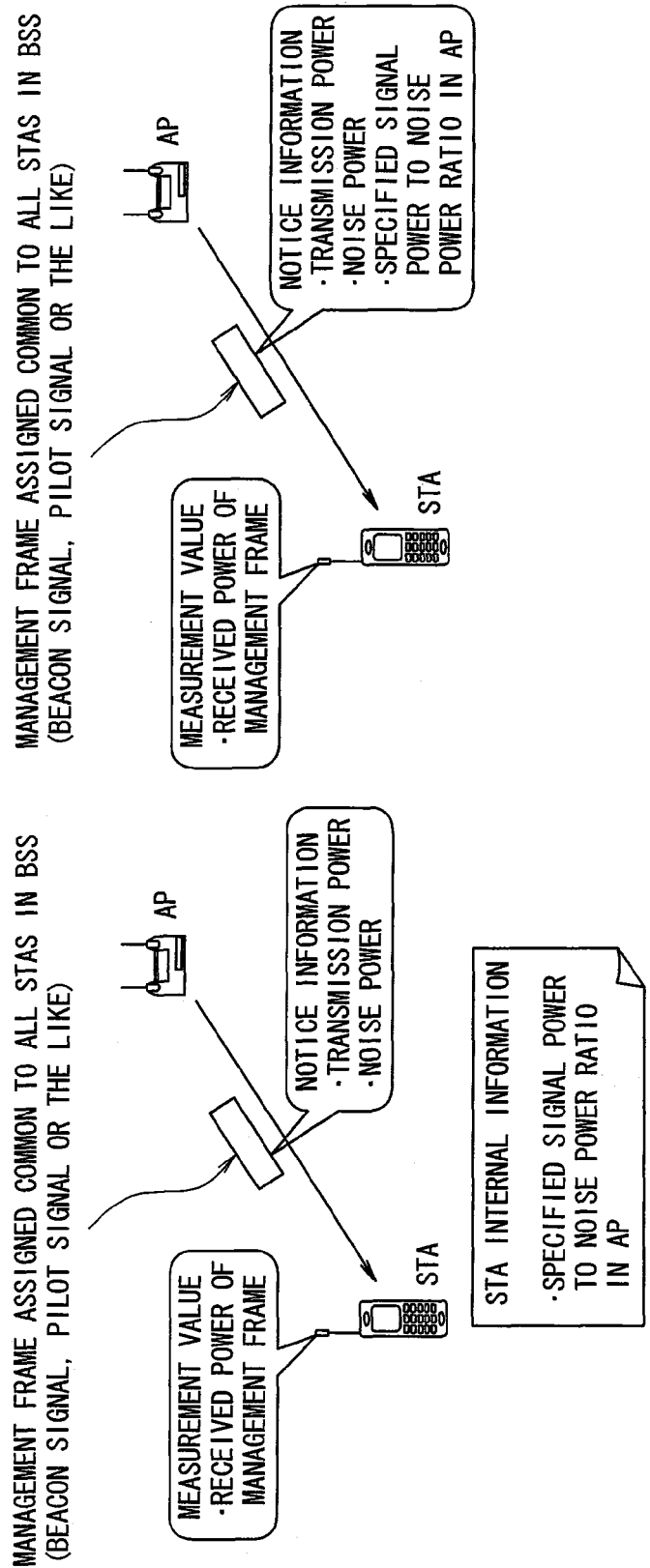

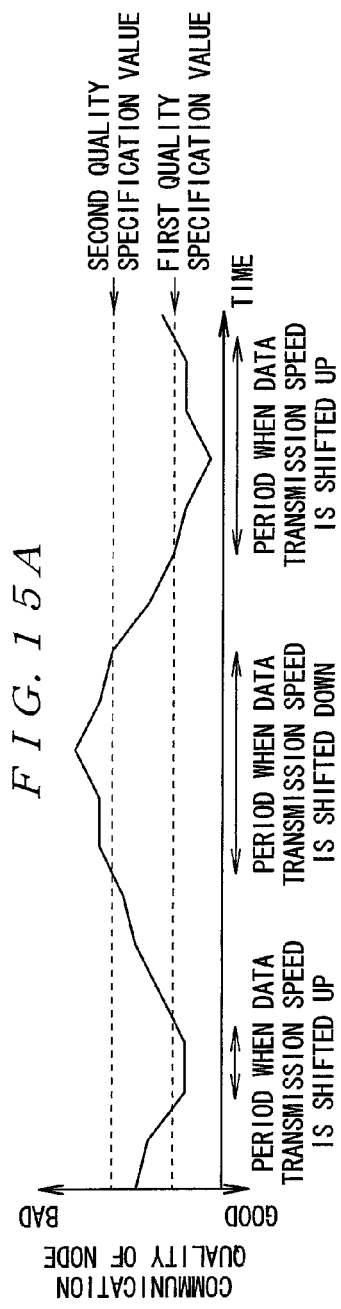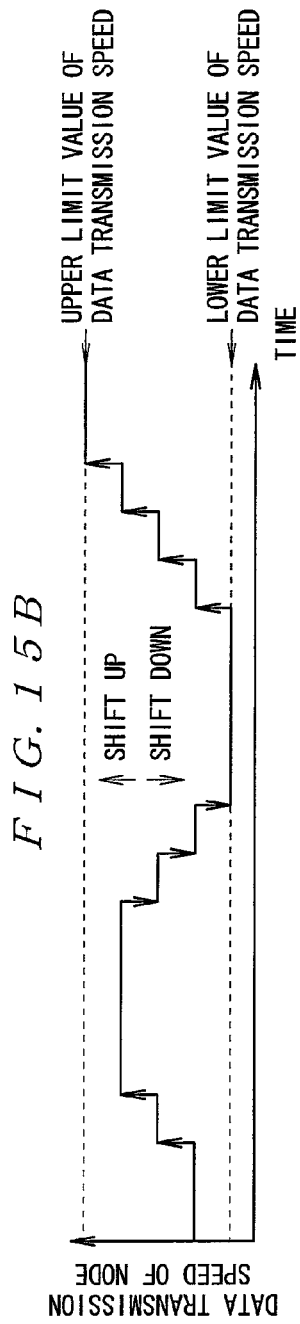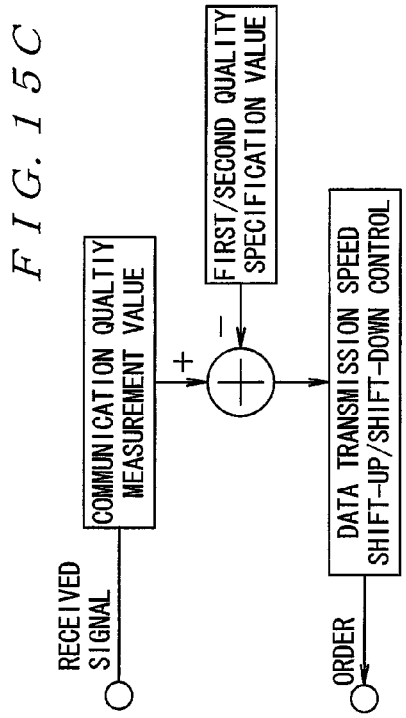

COMMUNICATION CONTROL DEVICE AND COMMUNICATION CONTROL METHOD

BACKGROUND OF THE INVENTION

1. Field of the Invention

The present invention relates to a wireless LAN system, and more particularly, a communication control device and a communication control method that use an IEEE 802.11 standard-compliant system and the infrastructure mode of the system.

2. Description of the Related Art

In these days, in a wireless local area network (LAN) system, an IEEE 802.11 standard-compliant system is used. In the IEEE 802.11 standard-compliant system, Carrier Sense Multiple Access with Collision Avoidance (CSMA/CA) is used for the access control of a medium (wireless channel).

With CSMA/CA, a node that sends a packet verifies the situation of a medium in order to prevent the loss of transmission data due to packet collisions. That is to say, in a wireless LAN system, before a packet that was sent from a sending node arrives at one receiving node, another packet that was subsequently sent from another sending node sometimes arrives at the receiving node. Packet collisions means that, in such a case, the receiving node cannot distinguish arrived packets or perform demodulation of data.

When packet collisions occurred, the receiving node has captured all the collided packets. Then the receiving node refers to a destination address put on the captured packet, and determines whether or not its own node is a destination. When the receiving node is the destination, it is determined that packet loss occurs, and the need of retransmission arises. Further, if the packet is management data or control data addressed to a plurality of nodes including the receiving node, degradation of communication quality and reduction in system throughput occur.

Note that no problem arises if the packet that triggered the collision was not destined to its own node.

In order to avoid such packet collisions, when a medium is not performing communication, a node waits to send packets (back off) for a random period within specified time (contention window), then sends the packets. On the other hand, when the medium is performing another communication, the node waits for the medium to be released, then sends the packets (transmission control). Then, after the medium is released, the node sends the packets again.

At this time, the node adjusts a modulation scheme, the number of multi-values (M-ary), and an error correcting coding rate depending on the size of the power of a signal, which arrives at a receiving side, and the quality of communication. The adjustment is performed by self-distributed adaptive modulation/demodulation operation at each node.

Further, adjustment by a node allows data transmission speed to be increased (shift-up) or reduced (shift-down). In CSMA/CA, the adjustment of the data transmission speed makes wireless resource utilization more efficient (maximization of data transmission speed, minimization of medium occupancy time of packet, and maximization of the probability of enabling connection of a medium at a node).

Note that transmission power of each node is usually fixed to equal to or less than the specified value of the standard, and that a node usually does not change the level in accordance with the situation of the medium and traffic.

More specifically, the situation of a medium is checked through the measurement of a wireless channel used for transmission by a node, which a node is attempting to send out a packet to. The measurement of the wireless channel allows the size of total received power, and the presence or absence of an arriving packet which reception is identifiable, to be determined. Note that the total received power is the sum of thermal noise power of a receiver, and received signal power of packets which have been sent out from another node, and arrived at its own node at the time of measurement.

When the total received power is larger than a preset threshold (carrier sense threshold), or when there is a arriving packet which reception is identifiable, the node determines that another communication being performed nearby or multiple communications being performed in the surrounding is the situation (Busy).

Note that "nearby" means an inter-node distance for which its own node is determined to be "Busy" as a result of another node sending a packet. In addition, "in the surrounding" means an inter-node distance for which its own node is determined to be "Busy" as a result of a plurality of other nodes sending packets simultaneously. Further, "long distance" means an inter-node distance for which its own node is not determined to be "Busy" even if a plurality of other nodes send packets simultaneously.

If the total received power is equal to or larger than the carrier sense threshold, or if there is an arriving packet which reception is identifiable, when new communication starts, packet collisions occur. In addition, interference of communication by another node causes congestion of a medium due to packet retransmission. Further, transmission error due to interference is promoted, and the throughput of the entire system is reduced.

On the other hand, when the total received power is less than the carrier sense threshold, and there is no arriving packet which reception is identifiable, it is determined that communication is not being performed nearby or in the surrounding (Idle). At that time, the node can start new communication.

However, even when Idle, due to the interference of communications being performed remotely, sometimes packets arrive at its own node with received powers such that the total amount of received signal power is equal to or less than the carrier sense threshold, or with received powers that do not allow identification of reception as packets. Such a state is a factor of shift-down because of avoidance of transmission error based on the adaptive modulation/demodulation operation, even if transmission data loss due to packet collisions does not occur.

As described above, with a carrier sense, packet collisions can be reduced to some extent to facilitate communication.

Prior arts of such a wireless LAN are described in Duck-Yong Yang et al, "Achieving Efficient Channel Utilization Using Dynamic Coverage Control in IEEE802.11," Proc. IEEE ISPACS, November 2004 (hereinafter referred to as Non-patent Document 1), Hector Velayos et al, "Load Balancing in Overlapping Wireless LAN Cells," IEEE ICC 2004, June 2004 (hereinafter referred to as Non-patent Document 2) and Olivia Brickley et al, "Load Balancing for QoS Optimisation in Wireless LANs Utilising Advanced Cell Breathing Techniques," Proc. IEEE VTC 2005-Spring, May 2005 (hereinafter referred to as Non-patent Document 3), for example. An infrastructure mode and an ad hoc mode are defined in the IEEE 802.11 standard-compliant wireless LAN system, and Non-patent Document 1 to Non-patent Document 3 are based on the regulation of the infrastructure mode.

Note that an infrastructure mode is the regulation of a wireless network comprised of two types of nodes: a base station (access point: AP) and a mobile terminal (station: STA). Further, an ad hoc mode is the regulation of a wireless network comprised of only STAs.

A set of one AP and a plurality of STAs attributed thereto in an infrastructure mode is referred to as a Basic Service Set (BSS). A BSS corresponds to a cell of a cellular system.

A technique described in Non-patent document 1 discloses that, in a configuration where infrastructure mode wireless LAN systems are densely deployed, the transmission power of an AP can be controlled to a necessary minimum value that each STA requires based on link margin information that has been reported by each STA. In the technique described in Non-patent document 1, such control allows interference between BSSs (temporal occupancy of the medium of a neighboring BSS) to be reduced, and wireless resources to be used efficiently, thus allowing the system throughput to be increased.

Note that the method disclosed in Non-patent Document 1 is particularly effective for a case where a frequency band assigned to the wireless LAN system is not sufficient for traffic, and interference between BSSs cannot be avoided due to the design of the BSS operating frequency.

In addition, Non-patent document 2 describes that, in the infrastructure mode wireless LAN system, as an AP to be connected to its own device, the STA selects an AP where the received signal is the strongest among a plurality of AP candidates. The technique disclosed in Non-patent Document 2 is a technique that balances, in such a configuration, the loads among self-distributedly overlapping APs, and increases the throughput of the LAN system to reduce a transmission delay.

More particularly, each AP regularly exchanges load information through a wired backbone, and selects an STA requiring hand-off in order to balance the load. At this time, the AP determines the state of its own device (high load, low load, adequate) based on the exchange result of the load information. The load information representing a state is represented by throughput in consideration of uplink and downlink traffics on each AP.

In addition, as a result of determination, an AP whose load was determined to be low actively accepts the roaming and new connection of STAs that a neighboring AP takes charge of. An AP whose load was determined to be adequate accepts the new connection of STAs. An AP whose load was determined to be high does not accept the new connection of STAs, and forces the existing STAs to be handed over in order to reduce the load.

Such a method disclosed in Non-patent Document 2 is effective in increasing the system throughput in a case where STAs in an area are unevenly distributed, and congestion occurs in the AP of a specific BSS, but congestion does not occur in the AP of the adjacent BSS.

In addition, Non-patent Document 3 describes that, in the infrastructure mode wireless LAN system, when the connections of the STAs having data to be transmitted concentrate on a specific AP, the AP whose load (number of connections of SATs) is high reduces transmission power to narrow BSS coverage. In addition, in Non-patent Document 3, the AP whose load is low increases transmission power to expand BSS coverage, in order to distribute the load among APs.

In such Non-patent Document 3, congestion occurs in a specific AP, thus allowing reduction in throughput due to packet collisions and packet retransmission, and the resulting increase in delay and degradation of Quality of Service (QoS) to be avoided. Non-patent Document 3 is effective in increasing the system throughput in a case where STAs in an area are unevenly distributed, and congestion occurs in the AP of a specific BSS, but congestion does not occur in the AP of the adjacent BSS.

However, the above-described carrier sense cannot completely avoid packet collisions when a hidden terminal problem arises. In addition, it is a problem that reduction in throughput due to an exposed terminal problem cannot sufficiently be prevented.

That is to say, a hidden terminal problem occurs when a packet which a sending node "a" sent cannot arrive at another sending node "b", for example, due to electric wave propagation environment such as obstacles and the distance between sending nodes. This is because, in such a case, the carrier sense cannot be performed properly, and the sending node "b" sends out a packet in spite of the fact that the sending node "a" is sending another packet.

Note that there is a propagation delay time problem as another cause of packet collisions. The propagation delay time problem means that, in spite of the fact that the carrier sense was performed properly, the sending node "b" cannot detect the start of packet sending from the sending node "a" because of the electric wave propagation delay between sending nodes, and starts sending out the packet almost simultaneously with the sending node "a".

Meanwhile, the exposed terminal problem is a problem that data is sent and received because of an unnecessary carrier sense, resulting in the reduction in system throughput.

For example, when the sending node "a" starts sending out a packet to a receiving node "a", the sending node "b" detects the packet of the sending node "a" with a carrier sense, and determines that the situation of the medium is Busy. At this time, when there is a packet which the sending node "b" is about to send to the receiving node "b", the sending node "b" is controlled to not send the packet but keep it.

However, in the case described above, a situation can also be considered, where the receiving node "a" and the receiving node "b" are distanced enough such that packet collisions do not occur even if the sending node "b" sends a packet to the receiving node "b". In such a situation, the carrier sense is unnecessary, reducing the system throughput.

The hidden terminal problem and the exposed terminal problem occur to predict packet collisions depending on the presence or absence of the packet sending in the sending node (verification of the situation of the medium with a carrier sense).

That is to say, when the sending node "a" and the receiving node "a" are at close enough spots, the node "b" detects the packet sending in the sending node "a" with the carrier sense and suppresses the sending, allowing packet collisions in the receiving node "a" to be avoided.

However, when the sending node "a" and the receiving node "a" are far from each other, even if the packets are arriving at the receiving node "a", sometimes the situation of the medium is not verified with the carrier sense of another sending node "b" due to shielding objects in the surrounding and attenuation of packets. In such a case, when the node "b" sends a packet to the receiving node "b", packet collisions occur in the receiving node "b" due to the hidden terminal problem.

In addition, when the sending node "a" and the receiving node "a" are far from each other, packets sent out from another sending node "b" are attenuated to a received signal power that does not cause packet collisions in the receiving node "a" while packets are arriving at the receiving node "a". In the present circumstances, even in such a case, the sending node "b" detects the sending of the packet to the receiving node "a" with a carrier sense and suppresses the sending. Accordingly, an exposed terminal problem arises, and efficient utilization of a wireless resource is prevented.

The Non-patent Document 1 exchanges control data (RTS: Request To Send, CTS: Clear To Send) among APs or among STAs prior to data transmission in order to avoid a hidden terminal problem. A technique described in such Non-patent Document 1 causes a possibility that a substantial throughput which can be assigned to user data is reduced by the exchange of control data.

In addition, in the technique described in Non-patent Document 1, only the transmission power of an AP is controlled, but transmission power of an STA is not controlled. Accordingly, in Non-patent Document 1, there is room for improvement on an interference reduction effect in a BSS. In addition, the technique described in Non-patent Document 1 assumes the Direct-sequence Spread Spectrum (DSSS) scheme in the physical layer, and is not applicable to the IEEE 801.11a and IEEE 802.11g standards which use the Orthogonal Frequency Division Multiplexing (OFDM) scheme. The OFDM scheme is a scheme which obtains high throughput in the same frequency occupancy band by adopting adaptive modulation/demodulation operation. The fact that the standard using such a scheme cannot be applied reduces the flexibility of the design of a wireless LAN system.

Further, techniques described in Non-patent Document 2 and Non-patent Document 3 can prevent connections from concentrating on a portion of nodes in a BSS, and reduce a probability that packet collisions occur. However, the techniques described in Non-patent Document 2 and Non-patent Document 3 do not consider the effect of interference, which occurs when a plurality of BSSs use the same frequency for communication. Accordingly, it is not unrealistic because it is required that there is a sufficient frequency band assigned to the traffic of the wireless LAN system, and that all the BSSs in an area are operated in different frequencies.

Furthermore, Non-patent Document 3 does not specifically describes a method for detecting the load of a BSS and the degradation of QoS, a relationship between a detected value and the control of transmission power, and a method for coordinating and controlling BSSs.

The present invention is made in light of the above points, and has an object to provide a communication control device and a communication control method that can efficiently use wireless resources to improve communication quality and system throughput by setting and performing node transmission power properly.

SUMMARY OF THE INVENTION

In order to solve the above problems, the invention according to claim 1 is a communication control device that controls the transmission power of a communication device, in an infrastructure mode wireless LAN system using CSMA/CA for access control to a wireless medium, and using adaptive modulation/demodulation operation for wireless transmission, characterized by comprising BSS discovery means for determining, based on at least one of wireless information obtained by measurement of a wireless signal by an access point or stations which are nodes in a BSS, which is a communication group including an access point and a plurality of stations, or the wireless information reported to the access point or the stations, whether or not there is a neighboring BSS, which is a BSS having a plurality of nodes, in which sending of a wireless signal by the plurality of nodes influences the communication of the access point or the stations, and transmission power setting means for setting the transmission power of the access point and each of the stations based on the result of the determination by the BSS discovery means, wherein, if it is determined by the BSS discovery means that there is a neighboring BSS, when all the access points constituting the neighboring BSS have the control function of the transmission power, the transmission power setting means sets the transmission power between the access point and each of the stations in its own BSS, which is a BSS including the transmission power setting means, and repeatedly updates the transmission power which is set every time the defined condition is satisfied, and, if there is an access point in the neighboring BSS that does not control the transmission power and if there is no neighboring BSS, maximizes the transmission power. According to such an invention, since the transmission power can be set based on information obtained by measurement of the wireless signal, an optimal transmission power can be set depending on the wireless situation including electric wave environment and user usage, allowing wireless resources to be used to the greatest extent possible. In addition, even if there is a BSS, which does not control transmission power in the surrounding of its own BSS, problems of reduction in the opportunity of the use of the wireless resources caused by the control of the transmission power by only its own BSS, coverage loss, and even interference on its own BSS can be prevented. Further, if there is no neighboring BSS, the wireless resources can be used sufficiently.

In addition, the invention according to claim 2 is characterized in that, in the communication control device according to claim 1, the transmission power setting means sets transmission power common to the access point and the stations when setting the transmission power of the access point and each of the stations in its own BSS. According to the present invention, the common transmission power is set, thus allowing reduction in the reception of signals for setting compared with when individual transmission power is set on the access point and each of the stations. In addition, the transmission powers of the access point and each of the stations match, allowing the arrival ranges for the downlink and the uplink to be matched. In addition, the time variation of the interference power leaked outside the BSS can be moderated.

In addition, the invention according to claim 3 is characterized in that, in the communication control device according to claim 1 or claim 2, the transmission power setting means sets different transmission power for each management frame, data frame, and control frame, which are packet types defined in the wireless LAN. According to the present invention, relatively large transmission power can be set on the management frame and the control frame which require more reliable arrival than the data frame, thus allowing the stability and the flexibility of control to be improved. In addition, the transmission power of the data frame is set to the minimum required regardless of the transmission power of the management frame and the control frame, thus allowing interference among BSSs to be reduced.

Further, the invention according to claim 4 is characterized in that, in the communication control device according to claim 1 or claim 2, the transmission power setting means sets and updates, at the access point, the transmission power of the access point, and notifies the station contained in the BSS of the set transmission power, or gives the station an instruction to set or update the transmission power. According to the present invention, the need to provide a determination function of transmission power on the station is eliminated, thus allowing the device configuration of the station to be simplified.

In addition, the invention according to claim 5 is characterized in that, in the communication control device according to claim 4, the transmission power setting means in the access point mutually communicates to an access point constituting the neighboring BSS, at least one of the wireless information obtained by measurement, the wireless information reported from the station to its own BSS, and information related to transmission power which is currently set. According to such an invention, the usage of the wireless resources can be shared among access points, which BSSs are adjacent to. Accordingly, the transmission power control can be arbitrated so that the usage rates of the wireless medium become equal to one another. For example, when coverage loss is detected between the BSSs as a result of wireless measurement, the access point in the BSS having smaller transmission power increases the transmission power, and relieves the coverage loss without imposing a burden on the BSS having larger transmission power.

In addition, the invention according to claim 6 is characterized in that, in the communication control device according to claim 1 or claim 2, the transmission power setting means initializes the transmission power as an absolute value, and performs update by increasing or reducing the transmission power set immediately before, directly with a value relative to the setting value immediately before and the setting value after update, or in a step unit defined for transmission power update. According to such an invention, when the transmission voltage is controlled directly, the transmission power can be controlled more rapidly than when performing gradual update in a defined step unit. On the other hand, when gradual update in a defined step unit is performed, stable transmission power control can be performed without sudden change in the transmission power before and after the transmission power control.

In addition, the invention according to claim 7 is characterized in that, in the communication control device according to claim 2, the transmission power setting means sets as the lower limit of transmission power control range, the transmission power whereby the farthest station in its own BSS sends a packet at the slowest data transmission speed and the packet obtains a defined quality at the access point, and determines the upper limit of transmission power control range by the maximum transmission power information contained in at least one of a beacon signal which is a management frame which the access point periodically sends out to all the stations in the BSS, a pilot signal for wireless resource measurement, or a management frame for response use sent back from the access point where the station performed attribution processing. According to such an invention, interference which does not contribute to the throughput due to sending by such small transmission power that the packet cannot obtain specified quality can be prevented. Moreover, performance of sending that exceeds the maximum transmission power allowed for the system by the transmission power control can be prevented.

In addition, the invention according to claim 8 is characterized in that, in the communication control device according to claim 1 or claim 2, the wireless information is information including at least one of a wireless measurement result which is a result obtained by measuring at least one of transmission power in a BSS operating frequency band, total received power, noise power other than during packet sending/receiving, signal power during packet receiving, a signal power to noise power ratio during packet receiving, propagation loss to the opposite station or access point, or the number of connection stations or visible access points, a communication quality measurement result obtained by measuring at least one of a packet collision occurrence rate, a packet retransmission occurrence rate, or a packet error rate, or a wireless medium usage rate, which indicates the percentage of packet sending/receiving time in specified observation time, and at least one of the wireless measurement result, the communication quality measurement result, and the wireless medium usage rate is an average value or statistics within a given length of time. According to such an invention, transmission power can be controlled with a high degree of accuracy based on the degrees of allowance of the present transmission power against the maximum value of the transmission power, the degrees of silence of a wireless channel viewed from the access point or the station, interference from neighboring BSSs and external noise having other origins than the wireless LAN, reception quality of the packet sent from the station or the access point, propagation loss in the BSS, the connection demand of the station, the communication situation of the packet, and the degrees of congestion of the wireless channel.

In addition, the invention according to claim 9 is characterized in that, in the communication control device according to claim 8, the noise power obtained as a result of the wireless measurement is a value including interference power. According to such an invention, components other than signals in wireless communication can be treated collectively as noise. As a result, the ratio of the signal power and the components other than the signal of the communication can be accurately evaluated.

In addition, the present invention according to claim 10 is characterized in that, in the communication control device according to claim 8 or claim 9, when the access point periodically sends at least one of a beacon signal, which is a management frame sent to all the stations in its own BSSs and includes transmission power information of the frame, or a pilot signal for wireless resource measurement, and the station, which is about to attribute itself to the access point, receives the beacon signal or the pilot signal, the transmission power setting means evaluates the propagation loss between the access point and the station based on the power of the received signal at the station and the transmission power information, and sets the initial value of the transmission power of the management frame, which is sent out by the station to attribute itself to the access point so that the transmission power of the management frame sent by the station obtains the specified received signal power at the access point. According to such an invention, the transmission power of the station can be set so that the received signal power at the access point becomes a value that is necessary and sufficient. As a result, the interference which the station gives to other nodes can be reduced. Further, the reception quality of the management frame can be kept.

In addition, the present invention according to claim 11 is characterized in that, in the communication control device according to claim 8 or claim 9, when the access point periodically sends at least one of a beacon signal, which is a management frame sent to all the stations in its own BSSs and includes transmission power information of the frame and noise power information of a frame to be sent, or a pilot signal for wireless resource measurement, and the station, which is about to attribute itself to the access point, receives the beacon signal or the pilot signal, the transmission power setting means sets, based on the noise information measured by the station, the initial value of the transmission power of the management frame, which is sent out by the station to attribute itself to the access point so that the transmission power of the management frame sent by the station obtains the received signal power having a specified signal power to noise power ratio at the access point. According to such an invention, the transmission power of the station can be set so that the signal power to noise power ratio at the access point becomes a value that is necessary and sufficient. As a result, the interference which the station gives to other nodes can be reduced. Further, the reception quality of the management frame can be kept.

In addition, the invention according to claim 12 is characterized in that, in the communication control device according to claim 10 or claim 11, if a management frame responding to the management frame sent out by the station to the access point is not sent back to the station even after a predetermined time has elapsed, the transmission power setting means increases by a defined step transmission power in the next attribution processing by the station. According to such an invention, even in a situation where there are large changes in the electric wave propagation environment, with error occurring between the propagation loss when evaluating the propagation loss between the access point and the station, and the propagation loss during actual communication, the packet retransmission can be reduced and the attribution processing management frame can be sent certainly.

In addition, the invention according to claim 13 is characterized in that, in the communication control device according to one of claim 10 to claim 12, the transmission power setting means sets the initial setting value of the transmission power of the management frame, the data frame, and the control frame other than for the attribution processing of the station to a value obtained by multiplying the setting value of the transmission power at the time of successful transmission of the management frame for attribution processing by the ratio of the initial transmission speed for each predetermined frame type and the transmission speed of the management frame for attribution processing. According to such an invention, the initial value of the transmission power of the station can be set so that the reception level such as the received signal power and the signal power to noise power ratio at the access point becomes a value that is necessary and sufficient. As a result, interference that the station gives to other nodes can be reduced, and the reception quality of various packets can be kept. Further, even in a situation where there are large changes in the electronic wave propagation environment, with error occurring between the estimated value of the propagation loss between the access point and the station, and the propagation loss during the actual communication, various packets can be communicated certainly.

In addition, the invention according to claim 14 is characterized in that, in the communication control device according to claim 4 or claim 5, the transmission power setting means in the access point increases the transmission power by a defined step when the wireless medium usage rate due to communication with the station attributed to the access point exceeds a first wireless medium usage rate threshold, and reduces the transmission power by a defined step when the wireless medium usage rate falls below a second wireless medium usage rate threshold smaller than the first wireless medium usage rate threshold. According to such an invention, congestion can be mitigated by assigning large transmission power during congestion of the wireless medium, and transmission power can be saved by assigning small transmission power during the off-peak time of the wireless medium.

In addition, the invention according to claim 15 is characterized in that, in the communication control device according to claim 14, the transmission power setting means performs a shift-up, which increases the data transmission speed to be set, on a node for which, as a result of the control of the transmission power, the data frame communication quality is smaller than a first quality specification value, that is to say, determined to be good, and performs a shift-down, which reduces the data transmission speed to be set, on a node for which the data frame communication quality is larger than a second quality specification value, that is to say, determined to be bad, the first quality specification value being smaller than the second quality specification value, and the update period of the data transmission speed being smaller than the update period of the transmission power. According to such an invention, the wireless medium usage rate can be reduced by increasing the data transmission speed when the communication quality is good. Meanwhile, the communication quality can be improved and kept within a specified range by reducing the data transmission speed when the communication quality is bad.

In addition, the invention according to claim 16 is characterized in that, in the communication control device according to claim 14, the transmission power setting means in the access point increases a first wireless medium usage rate threshold and a second wireless medium usage rate threshold when at least one of the packet transmission delay amount measurement results by the access point and the station attributed thereto is smaller than a packet transmission delay amount target value, and reduces the first wireless medium usage rate threshold and the second wireless medium usage rate threshold when the packet transmission delay amount measurement result is larger than the packet transmission delay amount target value, the update period of the wireless medium usage rate threshold being larger than the update period of the transmission power. According to such an invention, the packet transmission delay amount which can be actually obtained by transmission power control can be kept to almost a target value.

In addition, the invention according to claim 17 is a communication control method that controls the transmission power of a communication device, in an infrastructure mode wireless LAN system using CSMA/CA for access control to a wireless medium, and using adaptive modulation/demodulation operation for wireless transmission, characterized by comprising a BSS discovery step for determining, based on at least one of wireless information obtained by measurement of a wireless signal by an access point or stations which are nodes in a BSS, which is a communication group including an access point and a plurality of stations, or the wireless information reported to the access point or the stations, whether or not there is a neighboring BSS, which is a BSS having a plurality of nodes, in which sending of a wireless signal by the plurality of nodes influences the communication of the access point or the stations, and a transmission power setting step for setting the transmission power between the access point and each of the stations based on the result of the determination by the BSS discovery step, wherein, if it is determined by the BSS discovery step that there is a neighboring BSS, when all the access points constituting the neighboring BSS have the control function of the transmission power, the transmission power setting step sets each transmission power of the access point and the stations in its own BSS, which is a BSS where the transmission power setting step is performed, and repeatedly updates the transmission power which is set every time the defined condition is satisfied, and, if there is an access point in the neighboring BSS that does not control the transmission power and if there is no neighboring BSS, maximizes the transmission power. According to such the invention, since the transmission power can be set based on information obtained by measurement of the wireless signal, an optimal transmission power can be set depending on the wireless situation including electric wave environment and user usage, allowing wireless resources to be used to the greatest extent possible.

According to such an invention, in an infrastructure mode of wireless LAN systems, in particular IEEE 802.11 standard-compliant systems using CSMA/CA for medium access control, and adaptive modulation/demodulation operation for wireless transmission control, and subsequent systems thereof, the setting and update of the node transmission power are performed properly and efficiently to efficiently use wireless resources, and improve the communication quality and the system throughput.

BRIEF DESCRIPTION OF THE DRAWINGS

FIG. 5 is a diagram for showing a list of measurement targets at the access point in the embodiment of the present invention;

FIGS. 9A and 9B are diagrams for illustrating the setting of the transmission power of a management frame of the embodiment of the present invention;

FIGS. 10A and 10B are diagrams for illustrating a configuration for setting the transmission power based on a signal power to noise power ratio during reception of the embodiment of the present invention;

FIGS. 15A to 15C are diagrams showing time variation of the communication quality of a node of the embodiment of the present invention;

DETAILED DESCRIPTION OF THE PREFERRED EMBODIMENTS

Figure 1:
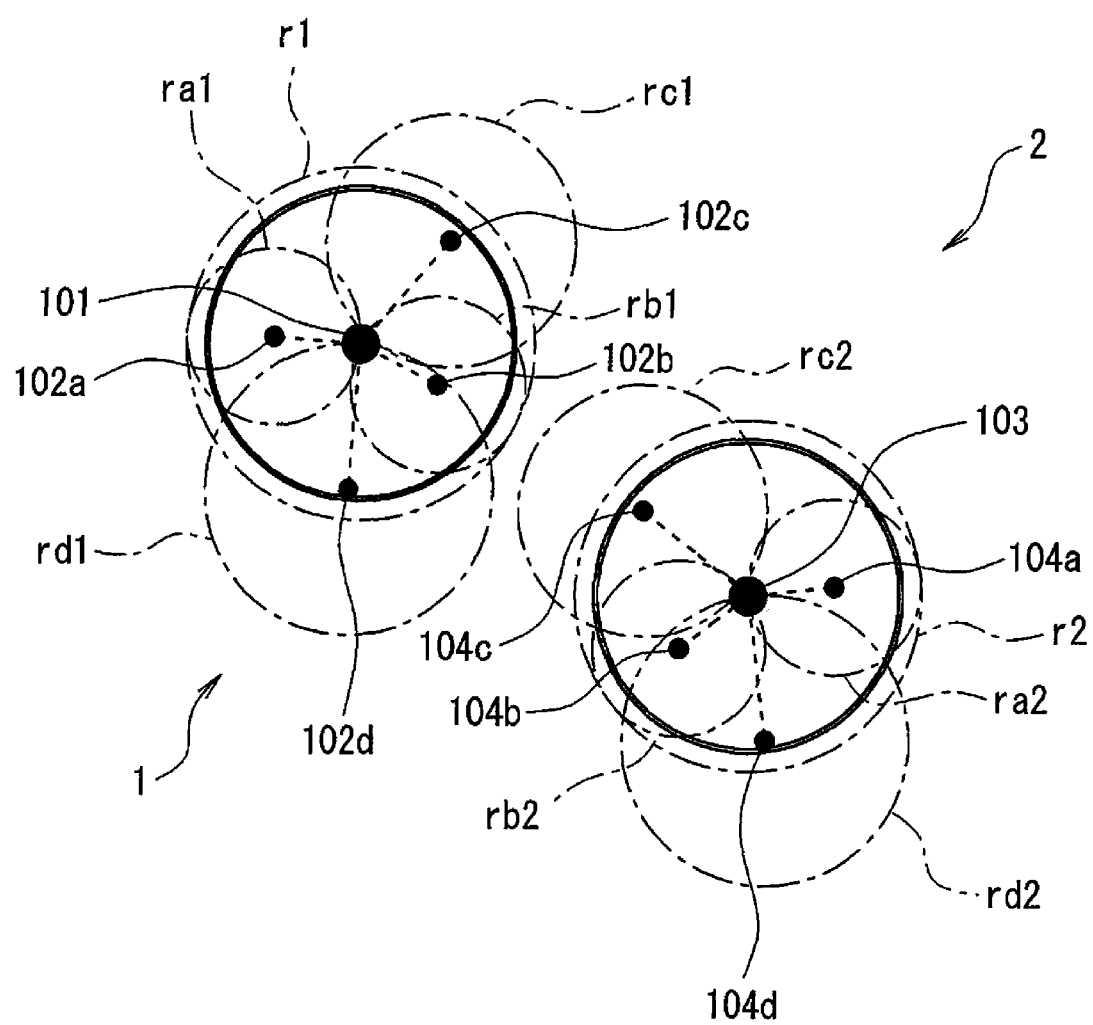
FIG. 1 is a diagram for illustrating a wireless LAN system to which a communication control device of an embodiment of the present invention is applied.

An embodiment of the present invention will be described below.

Note that in light of the following points, the present embodiment is constituted in order to achieve node transmission power control suitable for a wireless LAN system.

That is to day, in an IEEE 802.11 standard-compliant wireless LAN system, an infrastructure mode in which a wireless network is comprised of two types of nodes: a base station (AP: access point) and a mobile terminal (STA: station), and an ad hoc mode in which the wireless network is comprised of the stations are defined. In the infrastructure mode, a set of one access point and a plurality of stations attributed to the access point is called a Basic Service Set (BSS), which corresponds to a cell of a cellular system.

In the present embodiment, an example where a communication device of the present embodiment is applied to the infrastructure mode will be described below.

In the BSS, transmission from the station to the access point is called an uplink, and in the uplink, when a plurality of stations keep data to be transmitted to the access point, if the stations can perform a carrier sense on one another, packet collisions in the access point can be avoided except simultaneous transmission of packets which occurs by accident due to a propagation delay time problem.

However, when the transmission power, which was set on each station, is not sufficient, and a carrier sense cannot be performed among a portion of stations, a hidden terminal occurs. In such a case, while one station is sending out a packet to the access point, another station sends out a packet to the access point, resulting in the occurrence of packet collisions (its own cell interference). The packet collisions degrade system throughput because packet retransmission and shift-down due to transmission error avoidance occur.

In order to avoid throughput degradation, the transmission power of the station is set to be sufficient large, thus allowing the hidden terminal problem to be avoided, and the throughput to be increased. When there are no other BSSs using the same frequency in the surrounding, the BSS is determined to be an isolated cell. When the BSS is the isolated cell, the transmission power may be increased without trouble.

However, in an environment where other BSSs exist in the surrounding of the BSS (multi-cell environment), an increase in the transmission power of the station causes inter-BSS interference (other-cell interference).

In addition, sometimes the existence of a BSS which does not require communication control because the transmission power is large may be detected, and unnecessary transmission suppression (exposed terminal) may be caused. In addition, data transmission speed is reduced due to shift-down because of transmission error avoidance even if packet collisions do not occur, and the system throughput may be degraded. Thus, when the transmission power of the station is small, its own cell interference occurs, and when the transmission power of the station is large, other-cell interference occurs, therefore, in the wireless LAN system, appropriate transmission power suitable for the positions of nodes (topology) in the BSS has to be set.

In addition, in the downlink of the BSS (access point→station), when the access point keeps data to be transmitted to a plurality of stations, as in the case of the above described uplink, if the carrier sense can be performed on each access point in the neighboring BSS, which uses the same frequency, packet collisions in the access point can be avoided except simultaneous transmission of packets which occurs by accident due to a propagation delay time problem.

For example, when adjacent BSSs form a cell cluster with the same frequency shared, data transmission speed can be increased while avoiding the hidden terminal problem (its own cell cluster interference), by setting the transmission power of the access point to be large enough so as to allow the carrier sense to be performed mutually.

However, when there are cell clusters using the same frequency in the surrounding, inter-cell cluster interference (other-cell cluster interference) is caused, resulting in unnecessary transmission suppression (exposed terminal). In addition, data transmission speed is reduced due to shift-down because of transmission error avoidance even if packet collisions do not occur, and the system throughput may be degraded.

In addition, when the cells are not clustered, but divided for each BSS, and the same frequency is repeatedly used, large transmission power of the access point causes inter-BSS interference (other-cell interference), resulting in unnecessary transmission suppression (exposed terminal). Data transmission speed is reduced due to shift-down because of transmission error avoidance even if packet collisions do not occur, and the system throughput may be degraded.

Meanwhile, when the transmission power of each access point is not enough, and a portion of access points cannot mutually perform the carrier sense, the exposed terminal occurs. In such a case, while one access point is sending out a packet to another access point, another access point further sends out a packet to the same access point, resulting in the occurrence of packet collisions. The packet collisions degrade system throughput because packet retransmission and shift-down due to transmission error avoidance occur.

For example, when adjacent BSSs form a cell cluster with the same frequency shared, since the transmission power of the access point cannot be set to be large enough so as to allow the carrier sense to be performed mutually, the hidden terminal problem (its own cell cluster interference) occurs. The hidden terminal problem reduces the data transmission speed because of packet retransmission and shift-down, and causes coverage loss. However, when there are cell clusters using the same frequency in the surrounding, inter-cell cluster interference (other-cell cluster interference) is mitigated, thus the system throughput may be improved.

In addition, when the cells are not clustered, but divided for each BSS, and the same frequency is repeatedly used, somewhat small transmission power of the access point causes coverage loss, meanwhile inter-BSS interference (other-cell interference) is mitigated, thus the system throughput may be improved.

Thus, when adjacent BSSs form a cell cluster with the same frequency shared, if the transmission power of the access point is small, coverage loss and its own cell cluster interference occur, and if the transmission power of the access point is large, other-cell cluster interference occurs. In addition, when the cell is divided for each BSS, and the same frequency is repeatedly used, if the transmission power of the access point is small, coverage loss occurs, and if the transmission power of the access point is large, other-cell interference occurs. Accordingly, appropriate transmission power suitable for the positions of nodes (topology) in the BSS has to be set on the access point.

The topology in the BSS can be relatively easily grasped when nodes detect their positions and exchange position information with one another. However, since the assistance of other systems typified by the Global Positioning System (GPS) is needed for position detection, and where they can be used is limited, they are not suitable for the application to the wireless LAN system. Accordingly, a node transmission power control method is needed, which is adaptable to the topology in the BSS in a self-distributed manner.

1. Overall Configuration (Communication Control Function)

First, the overall configuration of the function related to the communication control of the communication control device of the present embodiment will be described.

FIG. 1 is a diagram for illustrating a wireless LAN system to which a communication control device of the present invention is applied. The shown wireless LAN system is an infrastructure mode system, which uses CSMA/CA for access control to a wireless channel that is a medium, and uses adaptive modulation/demodulation operation for wireless transmission. The communication control device of the present embodiment has a configuration for controlling the transmission power of the communication device applied to such a LAN system.

Two BSSs: BSS1 and BSS2 are shown in FIG. 1, the BSS1 including an access point 101 and a plurality of stations 102a to 102d. Further, the BSS2 includes an access point 103 and a plurality of stations 104a to 104d.

The broken lines shown in FIG. 1 represent the attribution relationships between the access point 101 and the stations 102a to 102d, and the access point 103 and the stations 104a to 104d. In addition, a range "r" shown by a dashed line shown in FIG. 1 represents a range at which the electric wave signal of the access point or the station arrives, r1 representing a range at which the electronic wave signal of the access point 101 in the BSS1 arrives, and r2 representing a range at which the electronic wave signal of the access point 103 in the BSS2 arrives. Further, regarding the electronic wave signal arrival ranges of the stations, subscripts a, b, c and d correspond to the symbols a, b, c and d of the stations, and the numeral 1 or 2 corresponds to the BSS1 and BSS2.

Note that the BSS means a basic group in the wireless LAN, which is comprised of one access point and a plurality of stations. In each BSS, all of the access points 101 and 103, and the stations 102a to 102d are nodes.

Figure 2:
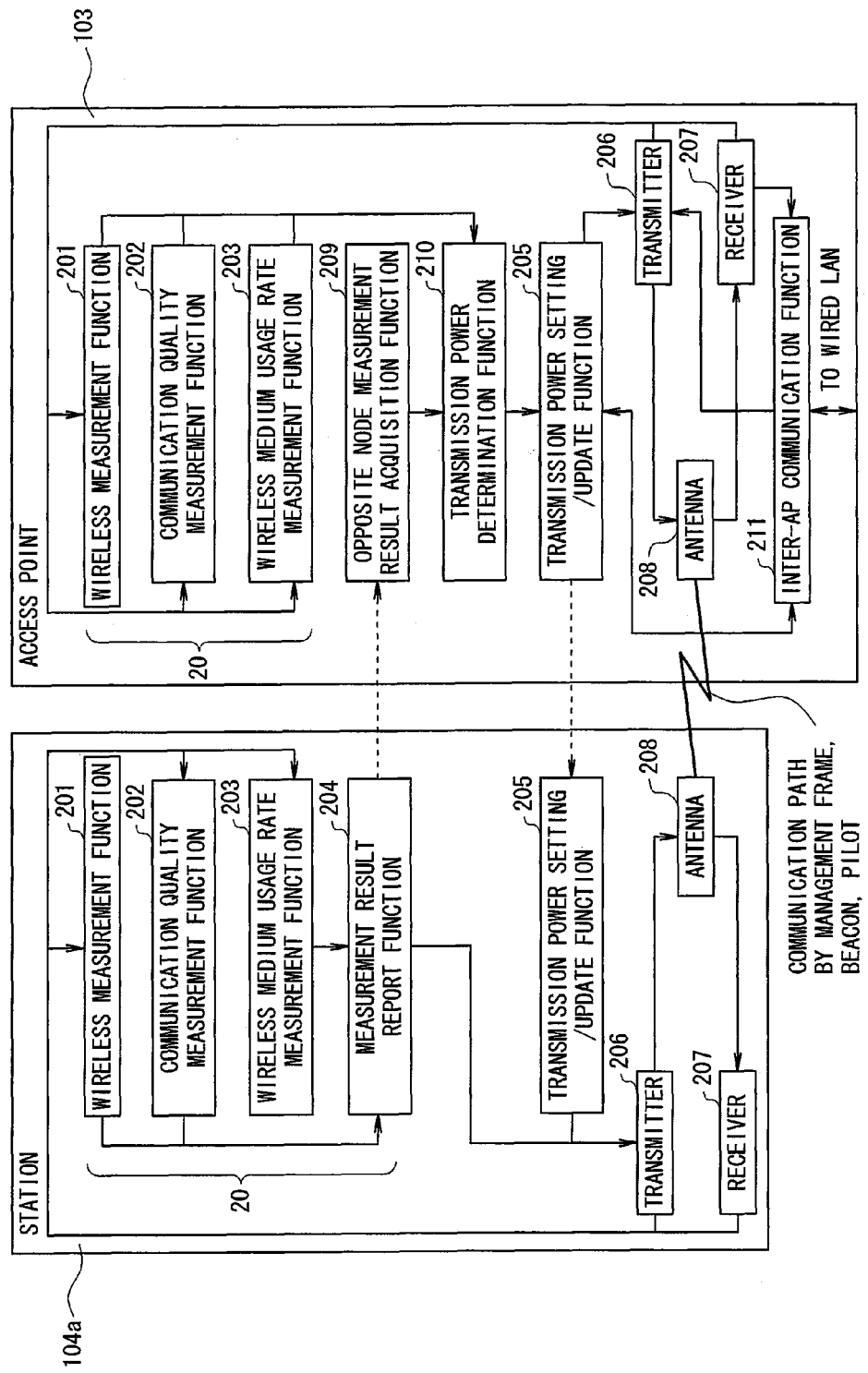
FIG. 2 is a diagram for illustrating the function of the communication control of access points 101 and 103, and stations 102a to 102d, and 104a to 104 shown in FIG. 1.

FIG. 2 is a diagram for illustrating the function of the communication control of access points 101 and 103, and stations 102a to 102d, and 104a to 104 shown in FIG. 1. The access points 101 and 103 have the same configuration, and all of the stations 102a to 102d, and 104a to 104d have the same configuration. In the present embodiment, the access point 103 and the station 104a are illustrative, and are substitutes for the representation and explanation of other access points and stations.

As shown in the drawing, the access point 103 comprises a transmitter 206, a receiver 207 and an antenna 208, which are hardware needed for communication, as well as a measurement function 20 for each type of signals to be communicated, an opposite node measurement result acquisition function 209, a transmission power determination function 210 and a transmission power setting/update function 205. In addition, the access point 103 comprises an opposite node measurement result acquisition function 209 for acquiring a result that obtained by the measurement of a wireless signal by a node, which is the party on the communication (opposite node), a transmission power determination function 210 for determining the transmission power from the acquired measurement result, and a transmission power setting/update function 205 for updating the determined transmission power.

In addition, the access point 103 comprises an inter-AP communication function 211, which is a program used for communication between the access point and the station.

Further, the station 104a comprises a measurement function 20 for each type of signals, which is similar to those in the access point 103, and a measurement result report function 204 for notifying the access point 103 of the transmission result. Moreover, the station 104a comprises a transmission power setting/update function 205 for setting the transmission power determined by the access point 103 based on the notified measurement result, and updating the set transmission power to the transmission power updated by the access point 103.

In such a configuration, the opposite node measurement result acquisition function 209 or the transmission power determination function 210 of the access point 103 determines whether or not there is a neighboring BSS based on at least one of wireless information obtained by the measurement of the wireless signal by the access point 103 or the stations 104a to 104d, which are nodes in the BSS2, or wireless information reported to the access point 103 or the stations 104a to 104d.

Note that, in the present embodiment, the neighboring BSS is a BSS, which has a plurality of nodes, in which sending of a wireless signal by a plurality of nodes influences the communication of the access point 103 or the stations 104a to 104d. It is assumed that the BSS2 including the access point 103 or the stations 104a to 104d is its own BSS, and the BSS1 is the neighboring BSS. In addition, an influence on communication means that when a plurality of nodes in the neighboring BSS send packets, nodes in the BSS2 become busy.

The transmission power determination function 210 sets each transmission power of the access point 103 and the stations 104a to 104d in the BSS2 based on the result of the determination of the presence or absence of BSS. In this setting, when there is an access point that is not performing transmission power control in the BSS2, and when there is no BSS that is a neighboring BSS, the transmission power is maximized.

Figure 3:
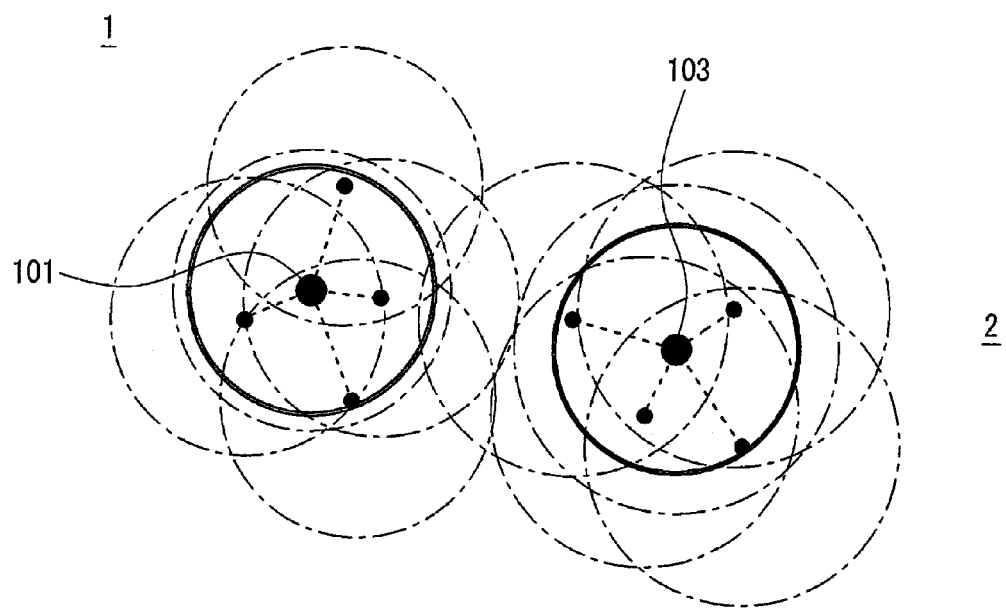
FIG. 3 is a diagram for illustrating a BSS in the surrounding of BSSs having no control function of transmission power in the embodiment of the present invention.
Figure 4:
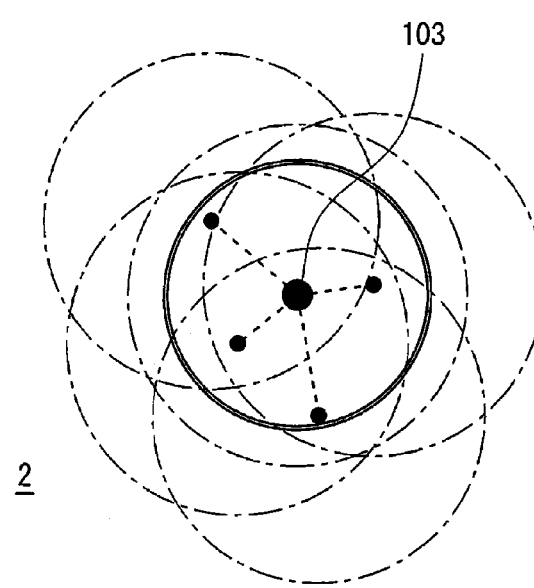
FIG. 4 is a diagram for illustrating an example where there is no neighboring BSS in the embodiment of the present invention.

FIG. 3 shows an example of a case in which the access point 101 does not have the control function of the transmission power. FIG. 4 shows the BSS2 in a case in which there is no BSS that is a neighboring BSS. In FIG. 3, the BSS2 recognizes that the BSS1 does not have a transmission power control function, and maximizes the transmission power. In this manner, even if there is a BSS, which does not control transmission power in the surrounding of its own BSS, the BSS2 can prevent problems of reduction in the opportunity of the use of the wireless resources caused by the control of the transmission power by only its own BSS and coverage loss.

Note that the inter-AP communication function 211 recognizes information or the like contained in a frame for response to a control frame sent by the access point, then the access point 103 in the BSS2 can detect the existence of the BSS1. In addition, similarly, whether or not the BSS1 has the control function of transmission power can also be detected using information contained in the response frame.

Further, transmission power control in the present embodiment comprises controlling the transmission power value, detecting that a node contained in its own BSS or a neighboring BSS will perform a wireless communication and controlling the timing of its own wireless communication.

Moreover, in an example shown in FIG. 4, the BSS2 cannot discover another BSS in the surrounding, therefore, the transmission power is maximized. In this manner, wireless resources can be used to the greatest extent possible.

In addition, the transmission power determination function 210 sets the transmission power between the access point 103 and each of the stations 104a to 104d in the BSS2, when there is a BSS1 wherein all the access points constituting the BSS have a control function of transmission power. At this time, the transmission power setting/update function 205 repeatedly updates the transmission power which is set every time a defined condition is satisfied.

In the above configuration, the transmitter 206, the receiver 207, and the inter-AP communication function serve as BSS discovery means of the present embodiment. Further, the transmission power setting function 210 and the transmission power setting/update function 205 serve as transmission power setting means.

Moreover, in the present embodiment, the transmission power setting function 210 and the transmission power setting/update function 205 set and update, in the access point 103, the transmission power of the access point 103. Furthermore, they notify the stations 104a to 104d contained in the BSS2 of the set transmission power. In addition, they can also give the stations 104a to 104d in the BSS 2 an instruction to set or update the transmission power.

When the communication control device of the present embodiment is constituted in this manner, the stations 104a to 104d do not have to have a transmission power determination function, thus the configuration of the device can be simplified. In addition, when a transmission power determination algorithm is modified, only the modification of the algorithm on the access point 103 side is needed, thus the modification of the algorithm can be simplified.

2. Wireless Information

Next, the wireless information of the present embodiment will be described. The wireless information of the present embodiment is measured by at least one of the measurement function 20 of the access point 103, or the measurement function 20 of the station 104a. The wireless information measured by the measurement function 20 of the station 104a is notified to the opposite node measurement result acquisition function 209 of the access point 103.

The measurement function 20 comprises a wireless measurement function 201, a communication quality measurement function 202 and a wireless medium usage rate measurement function 203. The wireless measurement function 201 has a configuration for measuring at least one of the transmission power in the BSS operating frequency band, total received power, noise power other than during packet sending/receiving, signal power during packet receiving, a signal power to noise power ratio during packet receiving, propagation loss to the opposite station or access point, or the number of connection stations or visible access points to obtain a wireless measurement result.

In addition, the communication quality measurement function 202 has a configuration for measuring at least one of a packet collision occurrence rate, a packet retransmission occurrence rate, or a packet error rate to obtain a communication quality measurement result. The wireless medium usage rate measurement function 203 has a configuration to obtain a wireless medium usage rate, which indicates the percentage of the packet sending/receiving time in specified observation time.

Further, at least one of the wireless measurement result, the communication quality measurement result, or the wireless medium usage rate is an average value or statistics within a given length of time. In addition, noise power obtained as a wireless measurement result is a value including interference power. Note that a list of measurement targets at the access point is shown in FIG. 5. In addition, the present embodiment may send the wireless information measured by the station to the access point for setting. Targets to be measured on the station side in such a configuration are also shown in FIG. 5.

According to such the invention, transmission power can be controlled with a high degree of accuracy based on the degrees of allowance of the present transmission power against the maximum value of the transmission power, the degrees of silence of a wireless channel viewed from the access point, interference from other neighboring BSSs and external noise having other origins than the wireless LAN system, reception quality of the packet sent from the station, propagation loss in the BSS, the connection demand of the station, the communication situation of the packet, and the degrees of congestion of the wireless channel.

3. Transmission Power Setting

Next, the setting of power of the communication control device of the present embodiment will be described.

(1) Common Setting and Individual Setting

Figure 6A:
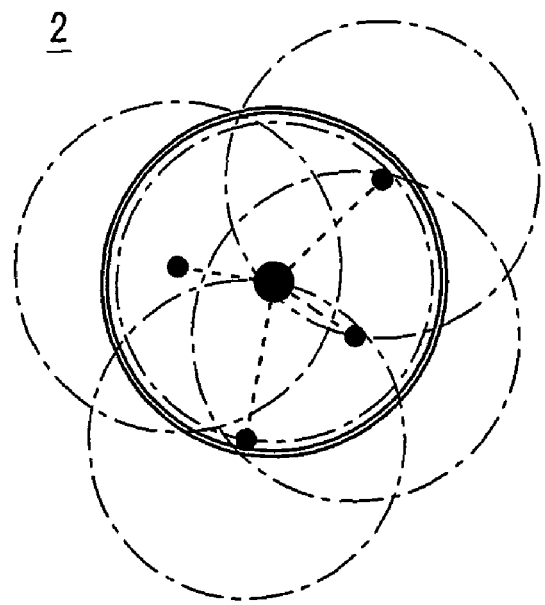
FIGS. 6A and 6B show an example where the communication control device of the embodiment of the present invention sets the transmission power common to a plurality of nodes contained in the BSS.
Figure 6B:
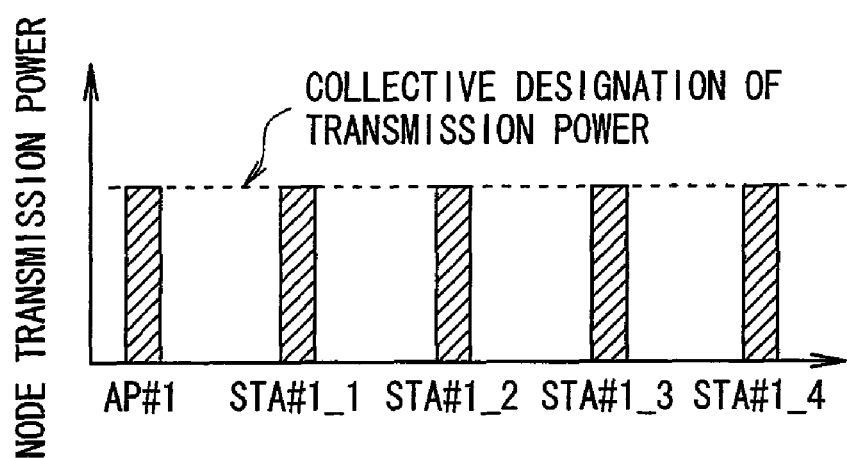
Figure 7A:
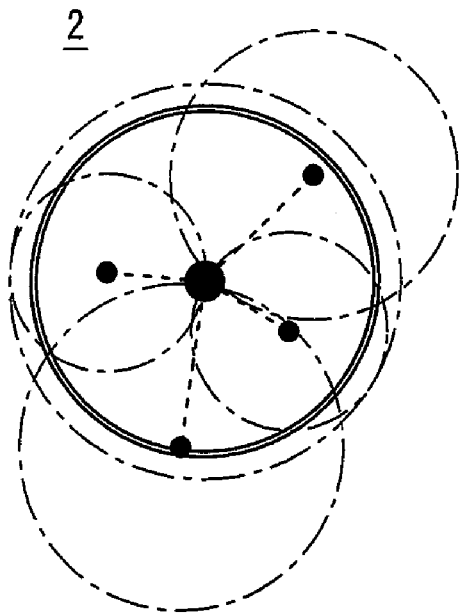
FIGS. 7A and 7B show an example where the communication control device of the embodiment of the present invention individually sets the transmission power on a plurality of nodes contained in the BSS.
Figure 7B:
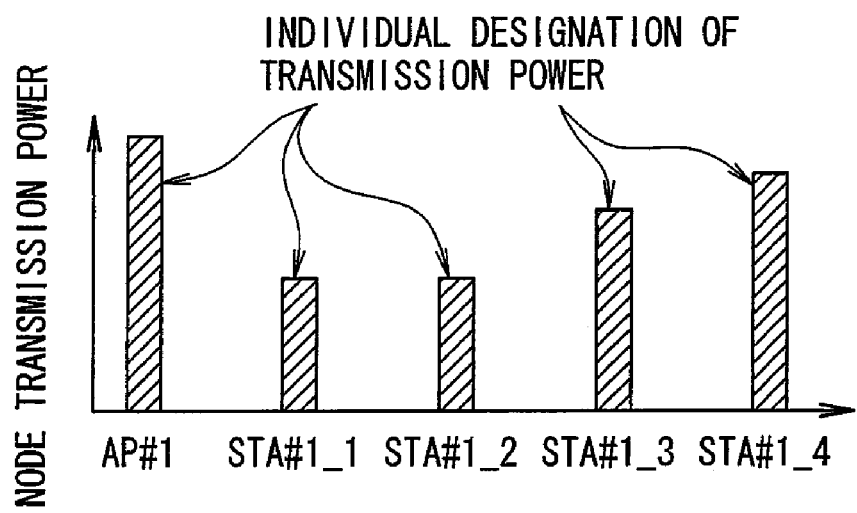

FIGS. 6A and 6B show an example where the transmission power common to a plurality of nodes is set when the communication control device of the present embodiment sets the transmission power of the node contained in the BSS. In addition, FIGS. 7A and 7B show an example for individually setting the transmission power on plurality nodes. FIGS. 6A and 7A represent the BSS2, and FIGS. 6B and 7B are graphs showing the transmission power which was set on each node. The vertical axis of the graphs of FIGS. 6B and 7B represents the transmission power of each node, and the horizontal axis represents the symbol of each node.

In these symbols, AP means an access point, and STA means a station. Further, AP#1 represents the access point 103, STA# 1_1 represents 104*a* in the BSS2, and thereafter, the numerals 2, 3 and 4 appended to the symbols correspond to 104*b*, 104*c* and 104*d*, respectively.

When the transmission power of each node is made constant, in any of cases in which individual transmission power is set on each node, in the communication control device of the present embodiment, transmission power which was set once is repeatedly updated so as to satisfy a defined condition.

When equal transmission power is set on a plurality of nodes, traffic for transmission power setting can be reduced compared with when the transmission power is set individually on the access point 103 and each of stations 104*a* to 104*d* in the BSS. In addition, the transmission powers of the access point 103 and each of the stations 104*a* to 104*d* match, allowing the arrival ranges for the downlink and the uplink to be matched. In addition, the time variation of the interference power leaked outside the BSS can be moderated.

(2) Transmission Power Setting By Packet Type

In the communication control device of the present embodiment, when individual transmission power is set on each node, the transmission power determination function 209 can set different transmission power for each management frame, data frame, and control frame, which are packet types defined in the wireless LAN.

According to such a present embodiment, the transmission power of a management frame and a control frame, which requires more definite arrival than a data frame, can be set to be relatively larger. Accordingly, stability and flexibility of system control are increased, and the transmission power of the data frame is set to the minimum required regardless of the transmission power of the management frame and the control frame, thus allowing the interference between the BSSs to be suppressed.

Figure 8A:
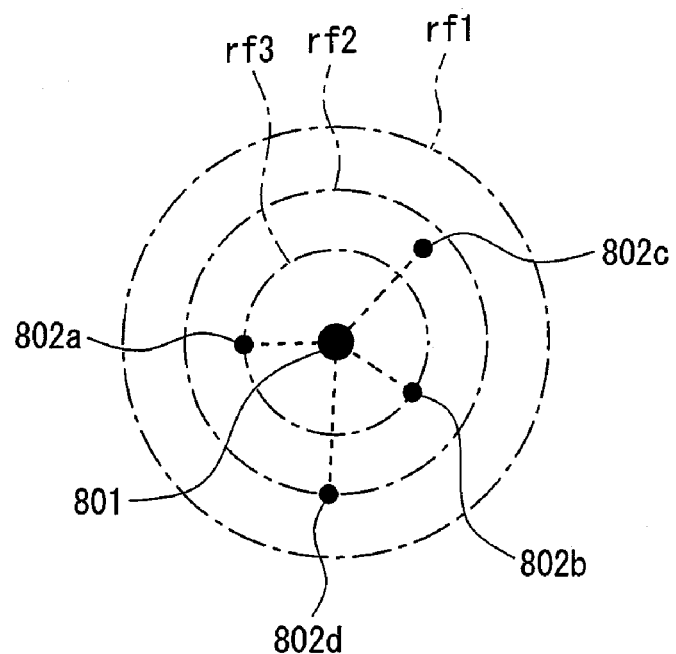
FIGS. 8A and 8B are diagrams for illustrating operation for setting the value of the transmission power based on the types of the frames of the embodiment of the present invention.
Figure 8B:
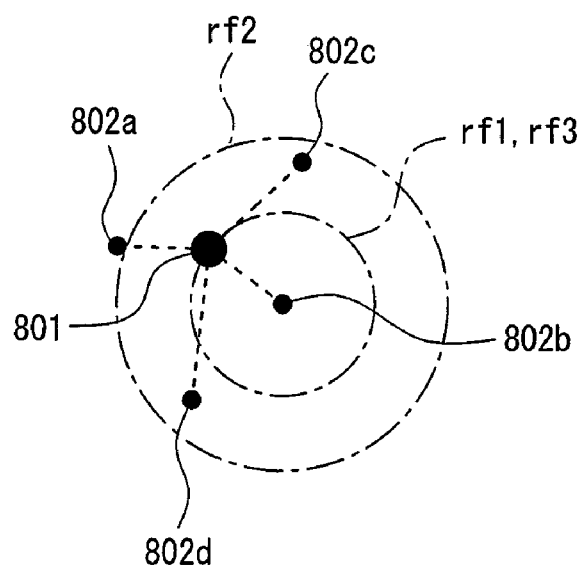

FIGS. 8A and 8B are diagrams for illustrating operation for setting the value of the transmission power based on the types of the frames. FIG. 8A shows an example of the initialization of the transmission power in a case of the downlink (AP→STA), and FIG. 8B shows an example of the initialization of the transmission power in a case of uplink (STA→AP).

When it is desired that the management frame is sent not only to nodes constituting its own BSS but also to nodes in other BSSs, the access point 801 sets the transmission power of the management frame to be relatively large. Note that an example of the management frame is a beacon signal, for example.

In addition, the access point 801 sets the transmission power of a control frame, of which the arrival to all the nodes constituting its own BSS is sufficient, to a value that is smaller than that of the management frame described previously. In addition, a transmission power that is even smaller than that of the control frame may be set on a data frame, of which the arrival to only a specific node in its own BSS is sufficient.

As a result, the arrival range rf1 of the management frame is the widest range, and the arrival range rf2 of the control frame is narrower than the arrival range rf1. Further, the arrival range rf3 of the data frame is further narrower.

In the uplink (STA→AP), the size relationship of the transmission power may be changed as appropriate depending on the current role of the packet types. That is to say, relatively large transmission power may be set on the control frame of which the arrival is desired at all the nodes, and transmission power smaller than that of the control frame may be set on the management frame and the data frame, of which arrival only at the access point is sufficient. As a result, in the example shown in FIG. 8B, the arrival range rf2 of the control frame is the widest, and the arrival range rf3 of the data frame and the arrival range rf1 of the management frame are equal.

(3) Transmission Power Setting

The communication control device of the present embodiment sets transmission power of each node based on the wireless information measured by each type of measurement function 20. Note that, in the operation described later, the access point periodically sends a beacon signal, which is a management frame, and a pilot signal for wireless resource measurement to all the stations in the BSS. The access point also receives the management frame for response sent back from an access point which performs attribution processing on the access point.

Note that the attribution processing is a series of processing in which the station sends the access point information including identification information or the like of its own station in order to notify that its own station is a node constituting the BSS together with the access point, and the access point registers the station that sent the information.

I when setting transmission power to common value on a Plurality of Nodes

When setting the transmission power common to the nodes in its own BSS, the transmission power determination function 210 in the access point 103 gives a station farthest from the access point 103 in its own BSS an instruction to send packets at minimum data transmission speed. Then, the transmission power whereby this sent packet can obtain a defined quality at the access point 103 is set as the lower limit of the transmission power control range.

In addition, the present embodiment sets the upper limit value of the power control based on the maximum transmission power information contained in at least one of the beacon signal, the pilot signal or the management frame for response.

According to such a present embodiment, the transmission power of the station can be set so that the received signal power at the access point may become a value that is necessary and sufficient. As a result, interference that the station gives to other nodes can be reduced, and the reception quality of the management frame can be kept.

II When Setting the Initial Value of Transmission Power to Individual Value Node By Node When the initial value of the transmission power is set to individual value node by node, in the present embodiment, the transmission power determination function 210 estimates propagation loss between the access point 103 and the stations 104a to 104d from the received signal power of the stations 104a to 104d and transmission power information. Then the initial value of the transmission power of the stations 104a to 104d is set so that the transmission power of the management frame sent out from the stations 104a to 104d obtains the defined received signal power at the access point 103.

In such operation, when only the access point 103 comprises the transmission power determination function 210 as shown in FIG. 2, the stations 104a to 104d measure the wireless information with the measurement function 20. Then the transmission power determination function 210 of the access point 103 obtains the measurement result through the opposite measurement result acquisition function 209. In addition, the initial value of transmission power is set based on the obtained information, and sent to the stations for setting.

Further, the present embodiment is not limited to a configuration in which only the access point 103 comprises the transmission power determination function 210, but may be constituted so that the stations 104a to 104d comprise the transmission power determination function 210.

FIGS. 9A and 9B are diagrams for illustrating the setting of the transmission power of the management frame. Both of FIGS. 9A and 9B represent a state where a management frame such as a pilot signal and a beacon signal is sent from the access point to the station. The management frame includes the transmission power of the frame that the access point sent as notice information from the access point to the station. The station receives the management frame and measures the power during reception. Then, the station calculates the propagation loss of the signal from the ratio between the power when the frame is sent and the power when the frame is received.

When only the access point comprises the transmission power determination function 210, the station sends the calculated propagation loss from the measurement result report function 204 to the opposite node measurement result acquisition function 209. The propagation loss is sent from the opposite node measurement result acquisition function 209 to the transmission power determination function 210. The transmission power determination function 210 sets, based on the calculated propagation loss, the transmission power of the management frame, which is to be sent by the station STA to attribute itself to the access point AP so that the power when the sent frame is received at the access point reaches a preset defined value.

FIG. 9A is an example where the defined power value is saved as a table or the like in the station STA. In addition, FIG. 9B is an example where the defined power value is sent from the access point AP to the station STA together with the management frame.

According to such a present embodiment, the transmission power determination function 210 can set the transmission power of the station so that the received signal power at the access point becomes a value that is necessary and sufficient. In addition, interference that the station gives to other nodes can be reduced, and the reception quality of the management frame can be kept.

Further, the present embodiment is not limited to the configuration in which transmission power is set based on the strength of the received signal at the access point as described above. For example, it may be considered that the transmission power is set based on the signal power to noise power ratio (hereinafter S/N ratio) during reception in place of the power of received signal.

FIGS. 10A and 10B are diagrams for illustrating such a configuration. In the illustrated configuration, the access point AP sends the transmission power as well as the power of the noise signal to the station STA. Based on the noise power information, the station STA sets the initial value of the transmission power of the management frame sent out from the station STA so that the access point AP obtains the defined signal power to noise power ratio.

FIG. 10A is an example where the defined S/N ratio is saved as a table or the like in the station STA. In addition, FIG. 10B is an example where the defined S/N ratio is sent from the access point AP to the station STA together with the management frame.

The present embodiment described above can set the transmission power of the station so that the S/N ratio of the signal at the access point becomes a value that is necessary and sufficient. As a result, interference that the station gives to other nodes can be reduced, and the reception quality of the management frame can be kept.

The setting of the transmission power based on the wireless information as described above can be used in combination with the transmission power by the above described packet types. That is to say, when the transmission powers of a plurality of nodes are set uniformly or individually based on the wireless information, the transmission power, which was set by the types of the packets, may be corrected.

II-1 When There is No Response to Management Frame for Attribution Processing

In addition, in the present embodiment, in the above configuration, when a management frame for response to the management frame, which is shown in FIGS. 9A, 9B, 10A and 10B, and sent out by the station STA to the access point AP, is not sent back to the station STA even after a predetermined time has elapsed, the station STA increases by a defined step the transmission power in the next attribution processing.

With such a configuration, when the station fails to transmit the management frame, which was sent out by the station to attribute itself to the access point, the station increases the transmission power in the next attribution processing. As a result, even in a situation where there are large changes in the electric wave propagation environment, the control delay of the transmission power cannot be ignored, and error occurs between the propagation loss when evaluating the propagation loss between the access point and the station, and the propagation loss during the actual communication, the number of the packet retransmissions can be reduced, and the management frame for attribution processing can arrive at the access point in a short time.

Figure 11:
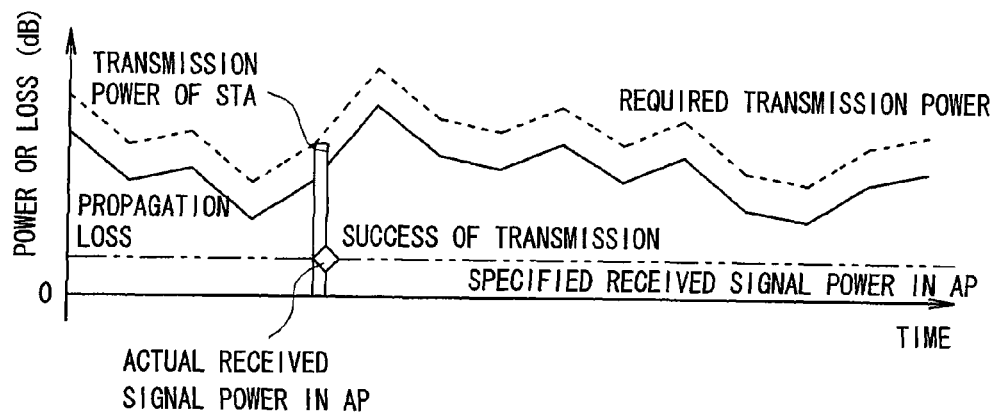
FIG. 11 is a graph showing time variation of power and propagation loss when the control delay of the transmission power can be ignored in the embodiment of the present invention.
Figure 12:
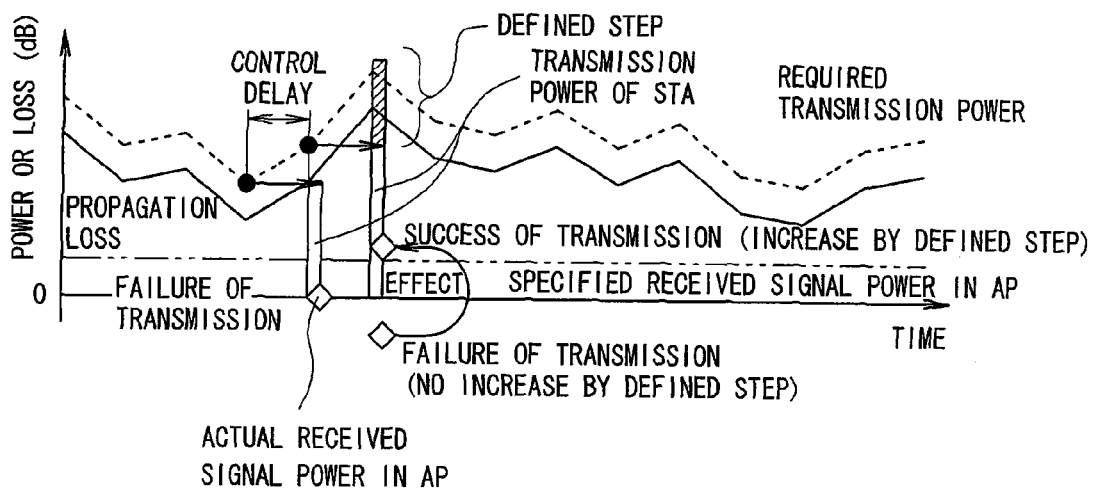
FIG. 12 is a graph showing time variation of power and propagation loss when the control delay of the transmission power cannot be ignored in the embodiment of the present invention.

FIGS. 11 and 12 are diagrams for illustrating the above described configuration. FIG. 11 is a graph showing time variation of power and propagation loss when the control delay of the transmission power can be ignored. In the example shown in FIG. 11, the station sets the transmission power based on the estimated propagation loss and the defined received signal power at the access point and sends out the management frame to the access point. At this time, since the control delay can be ignored, the signal power received at the access point satisfies the defined received signal power, and the transmission of the management frame is achieved.

FIG. 12 is a graph showing time variation of power and propagation loss when the control delay of the transmission power cannot be ignored. The control of the transmission power usually needs a given length of time. Accordingly, in a situation where there are large changes in the electronic wave propagation environment, and the propagation loss changes significantly, the control delay cannot be ignored. The propagation loss when the management frame is actually sent has changed from the propagation loss that was estimated by the station because of control delay.

At this time, if the propagation loss during sending is larger than the propagation loss during estimation, the actual received signal power at the access point falls below the defined received signal power, and the transmission of the management frame fails. In such a case, the station would resend the management frame. However, when the same transmission power is used for retransmission, the transmission may fail similarly.

Accordingly, in the present embodiment, at the time of resending, the station sets the transmission power, which is the transmission power obtained based on the propagation loss estimated in advance and the defined received signal power at the access point, to which a transmission power for a specified step has been further added. In this manner, a probability that transmission fails can be reduced compared with a case where retransmission is performed using the same transmission power as the transmission power used for failed transmission.

In addition, in the present embodiment, until the transmission of the same management frame is achieved, the addition by the defined step may be repeated many times. The control by the addition of such transmission power can be similarly performed in a case where the transmission power of the station is determined using the S/N ratio of the signal at the access point.

III Application to Management Frame Other Than Management Frame for Attribution Processing In the above described present embodiment, the setting of the transmission power of the management frame for attribution processing in which the station asks the access point for attribution processing has been described. However, the present embodiment can set the transmission power of a frame other than the frame for attribution processing as follows.

That is to say, the initial setting values of the transmission power of the management frame, the data frame, and the control frame other than for attribution processing sent out by the station can be obtained, as shown in the expression (1), by setting the value, which is the setting value of the transmission power at the time of the successful transmission of the management frame for attribution processing multiplied by the ratio between the predefined initial transmission speed for each frame type and the transmission speed of the management frame for attribution processing.

transmission power initial setting value of frame other than for attribution processing=transmission power value at the time of the successful transmission of the management frame for attribution processing×transmission speed of frame other than for attribution processing/transmission speed of management frame for attribution processing    expression (1)

By setting the transmission power of the frame other than the management frame for attribution processing using the expression (1), the present embodiment can set the initial value of the transmission power of the station so that the reception level such as the received signal power and the S/N ratio at the access point becomes a value that is necessary and sufficient. As a result, interference that the station gives to other nodes can be reduced, and the reception quality of various packets can be kept.

Further, even in a situation where there are large changes in the electronic wave propagation environment, and difference is caused between the estimated value of the propagation loss between the access point and the station and the propagation loss during sending/receiving, various packets can be transmitted certainly.

(4) Update of Transmission Power

Next, operation for communicating the transmission power which was set in the above described manner will be described. The transmission power determination function 210 in the access point 103 of the present embodiment updates the transmission power by mutually communicating to the access point 101 constituting the neighboring BSS at least one of the wireless information obtained by measurement, the wireless information reported from the station in its own BSS, and information related to the transmission power which is currently set.

Such communication is performed by the inter-AP communication function 211 shown in FIG. 2. The inter-AP communication function 211 communicates with the access point constituting the neighboring BSS through the wireless or wired LAN of the access point.

With such a configuration, the present embodiment can share the usage of wireless resources among the access points in the neighboring BSSs, and arbitrate the transmission power control so that the usage rates of the wireless medium become equal to one another. For example, when coverage loss is detected between the BSSs as a result of wireless measurement, the access point in the BSS having smaller transmission power increases the transmission power, and relieves the coverage loss without imposing a burden on the BSS having larger transmission power.

Figure 13A:
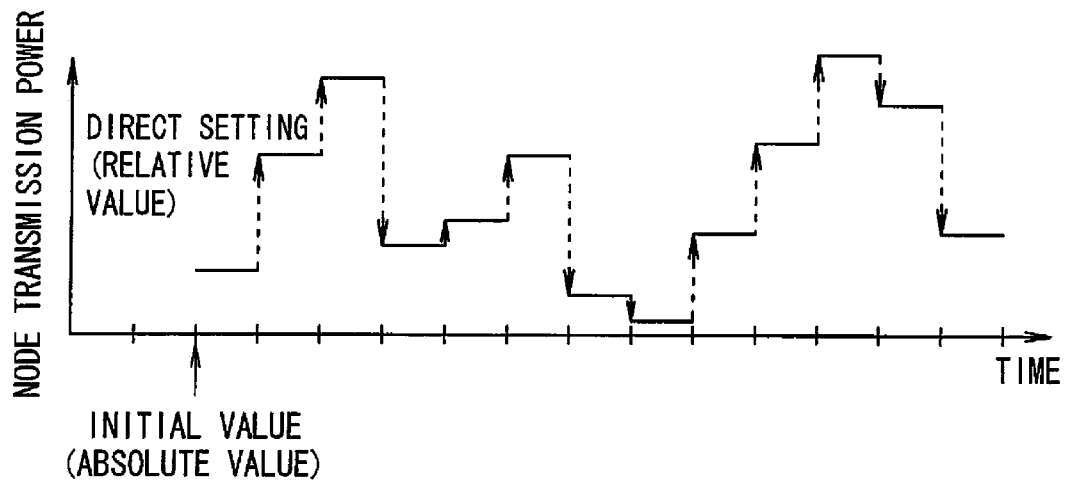
FIGS. 13A and 13B are diagrams for concretely illustrating a method for changing the transmission power of the embodiment of the present invention.
Figure 13B:
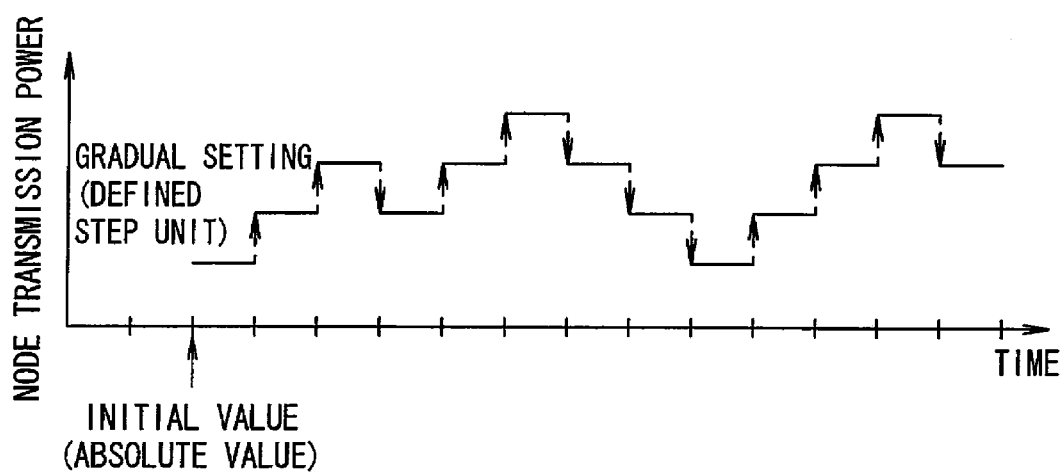

FIGS. 13A and 13B are diagrams for concretely illustrating a method for changing the transmission power by the transmission power determination function 210. In FIG. 13A, the transmission power is initialized as an absolute value, and the transmission power is changed directly with a value relative to the setting value immediately before and the setting value after update. That is to say, in the operation shown in FIG. 13A, the transmission power changes directly from the setting value before the communication to the setting value after update. In this manner, the transmission power can be set to the setting value after communication rapidly.

In addition, FIG. 13B shows an example where update is performed by initializing the transmission power as an absolute value, and increasing and reducing the transmission power, which was set immediately before by a defined step for transmission power update. In this manner, since a transmission power value that changes before and after the transmission power control is fixed, sudden change does not occur, and stable transmission power control can be performed. Note that the update method of the transmission power shown in FIG. 13B is also referred to as gradual update.

I Update of Transmission Power When Wireless Medium Usage Rate is a Defined Condition As described above, the update of the transmission power of the present embodiment is repeatedly updated every time the defined condition is satisfied. The update of the transmission power based on the usage rate of the wireless medium will be described here. The present embodiment updates the set transmission power by increasing the transmission power by a defined step when the wireless medium usage rate based on the communication between the access point and the stations attributed to the access point exceeds a first wireless medium usage rate threshold, and reducing the transmission power by a defined step when the wireless medium usage rate falls below a second wireless medium usage rate threshold smaller than the first wireless medium usage rate threshold.

In the above configuration, the first wireless medium usage rate threshold, and the second wireless medium usage rate threshold are defined conditions, and exceeding the first wireless medium usage rate threshold and falling below the second wireless medium usage rate correspond to the satisfaction of the defined conditions.

Figure 14:
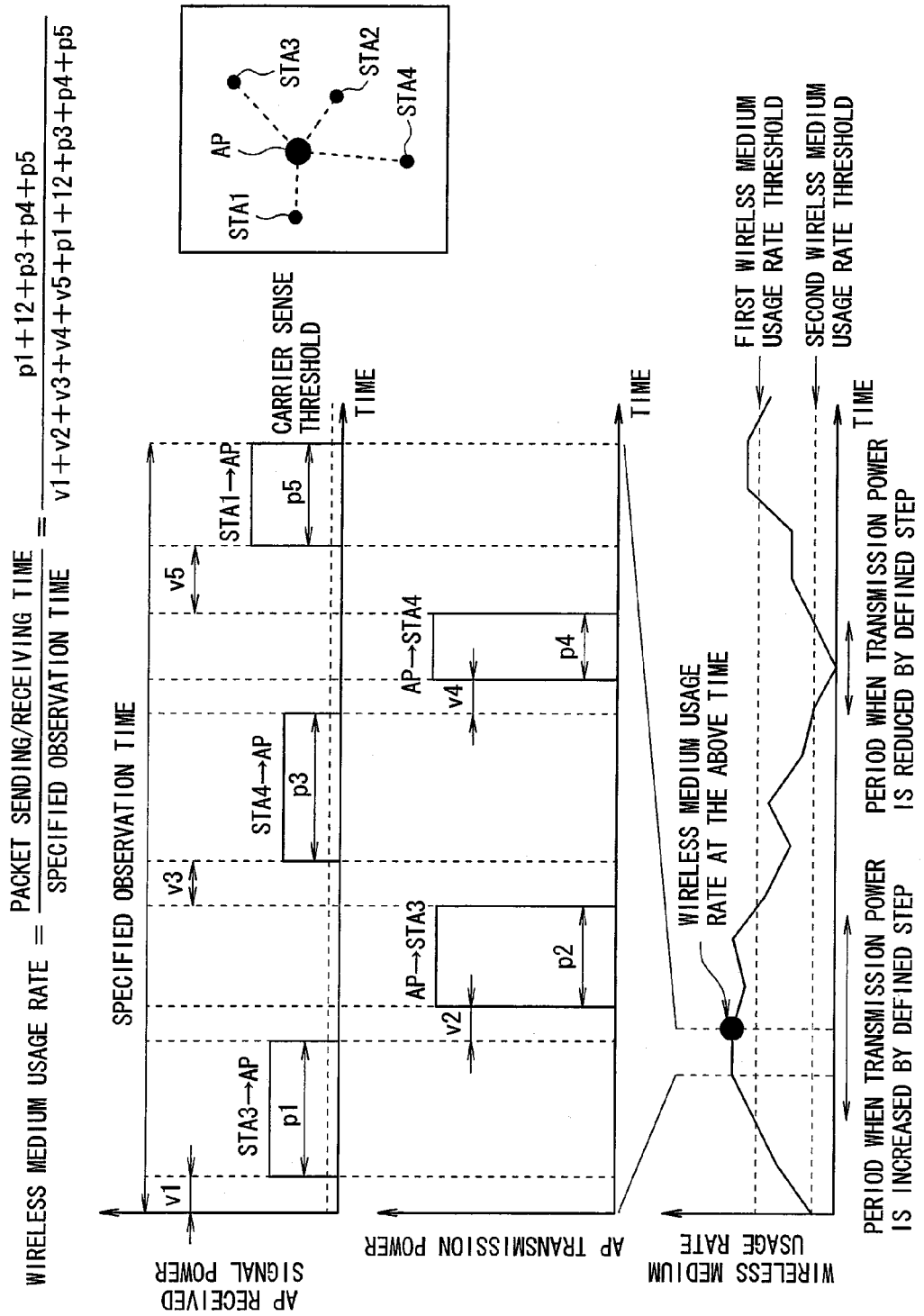
FIG. 14 is a diagram for illustrating the operation of transmission power update of the embodiment of the present invention.

FIG. 14 is a diagram for illustrating the above described update operation. The wireless medium usage rate means the percentage of the packet sending/receiving time in specified observation time. The wireless medium usage rate may be an average value and statistics within a given length of time. As shown in the drawing, the present embodiment increases the transmission power by a defined step at every update timing during the period when the wireless medium usage rate exceeds the first wireless medium usage rate threshold. On the other hand, during the period when the wireless medium usage rate falls below the second wireless medium usage rate threshold, the transmission power is reduced by a defined step at every update timing.

According to such a present embodiment, congestion can be mitigated by assigning large transmission power during congestion of the wireless medium, and transmission power can be saved by assigning small transmission power during the off-peak time of the wireless medium.

II Update of Data Transmission Speed Based on Communication Quality

In the present embodiment, as a result of control of the transmission power as described above, the transmission power determination function 210 further performs a shift-up, which increases the data transmission speed to be set, on a node for which the data frame communication quality is smaller than a first quality specification value, that is to say, determined to be good, and performs a shift-down, which reduces the data transmission speed to be set, on a node for which the data frame communication quality is larger than a second quality specification value, that is to say, determined to be bad. In such operation, the first quality specification value is smaller than the second quality specification value. In addition, the update period of the data transmission speed is set to be smaller than the update period of the transmission power.

In the above configuration, the first quality specification value, and the second quality specification value are defined conditions, and falling below the first quality specification value and exceeding the second quality specification value correspond to the satisfaction of the defined conditions.

FIG. 15A is a diagram showing time variation of the communication quality of a node. The communication quality in the present embodiment means at least one of the packet collision occurrence rate, the packet retransmission occurrence rate, or the packet error rate. A smaller value of the communication quality indicates a higher quality. The first quality specification value in the drawing indicates communication quality smaller than the second quality specification value, and higher than the second communication quality.

FIG. 15B is a diagram showing time variation of the data transmission speed shifted up and shifted down based on the communication quality shown in FIG. 15A. As shown in the drawing, the transmission speed is shifted up which increases the transmission speed of the node during the period when the communication quality of a node is determined to be better than the first quality specification value, and shifted down which reduces the transmission speed of the node during the period when the communication quality of the node is determined to be worse than the second quality specification value. Note that when the communication quality is determined to be better than the second quality specification value, and worse than the first communication quality specification value, the current transmission speed is kept.

The communication quality of the signal received at the access point or the station is measured by the communication quality measurement function 202. As the measurement result, the size relationship of the first communication quality specification value and the second communication quality specification value is determined.

The result of the determination is sent to the transmission power determination function 210 directly or indirectly. The transmission power determination function 210 gives the transmission power setting/update function 205 an instruction to shift up or shift down the data transmission speed based on the communication quality, and the size relationship between the first communication quality specification value and the second communication quality specification value.

Note that the above control is not limited to the function shown in FIG. 2, and may be achieved by a hardware configuration. FIG. 15C is a diagram exemplifying an operation circuit for performing shift-up and shift-down.

Operating in this manner, the present embodiment can use the wireless resources to the greatest extent possible depending on the communication quality. In addition, the upper limit and the lower limit may be provided on the setting range of the data transmission speed. The width of changes in the data transmission speed when shifting-up or shifting-down may not be fixed, and may transit between any predetermined discrete values, for example.

III Adjustment of First Wireless Medium Usage Rate Threshold and Second Wireless Medium Usage Rate Threshold The adjustment of the first wireless medium usage rate threshold and the second wireless medium usage rate threshold described in FIG. 14 will be described below.

In the present embodiment, when at least one of the packet transmission delay amount measurement result of an access point or that of a station attributed to the access point is smaller than the packet transmission delay amount target value, the first and second wireless medium usage rate thresholds are increased. In addition, when the packet transmission delay amount measurement result is larger than the packet transmission delay amount target value, the first and second wireless medium usage rate thresholds are reduced. The update period of the wireless medium usage rate threshold at this time is set to be larger than the update period of the transmission power.

Figure 16:
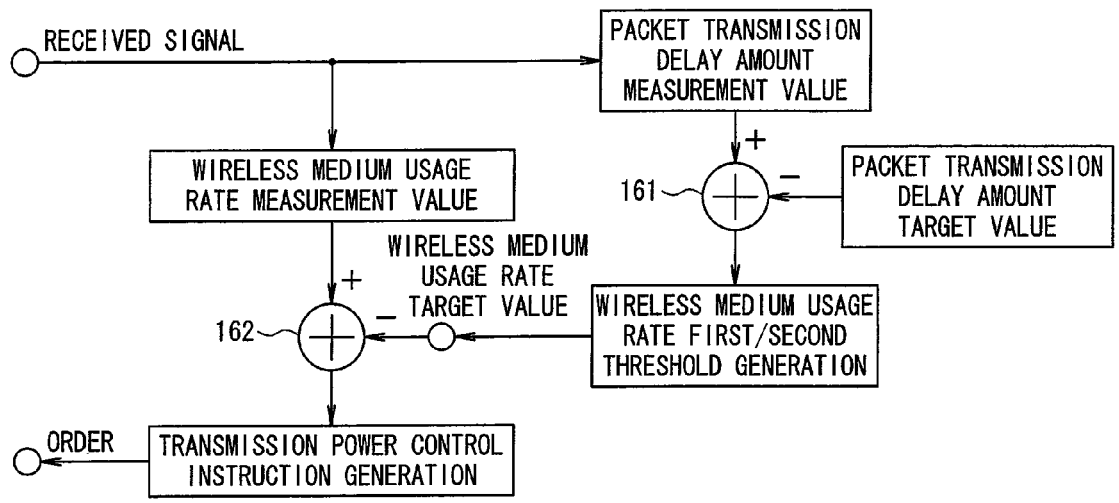
FIG. 16 is a diagram for illustrating a configuration for adjusting a first wireless medium usage rate threshold and a second wireless medium usage rate threshold of the embodiment of the present invention.

FIG. 16 is a diagram for illustrating the configuration for adjusting the first and second wireless medium usage rate thresholds. In the present embodiment, it is assumed that the configuration shown in FIG. 16 is realized by an operation circuit. The hardware configurations of the access point and the station of the present embodiment will be shown later. The operation circuit shown in FIG. 16 is contained in a transmission power setting units that the access point and the station have.

As shown, the packet transmission delay amount of the signal received at the access point and the station is measured and the measurement result is compared with the target value of the transmission delay amount by an addition circuit 161.

Then the first and second thresholds of the wireless medium usage rate are updated based on the size relationship of at least one of them and the target value. In the addition circuit 162, the size relationship of the wireless medium usage rate of the received signal is compared with the first and second thresholds of a newly generated wireless medium usage rate. Based on the size relationship, the transmission power settings of the access point and the station are updated.

Note that the generation of the instruction of transmission power control is more often performed than the update of the threshold of the wireless medium usage rate. The transmission power control instruction may be set on the sending means in its own node, or on the opposite node.

The above operation allows the present embodiment to keep the packet transmission delay amount which can be actually obtained by transmission power control to almost a target value.

(5) Device Configuration

Figure 17:
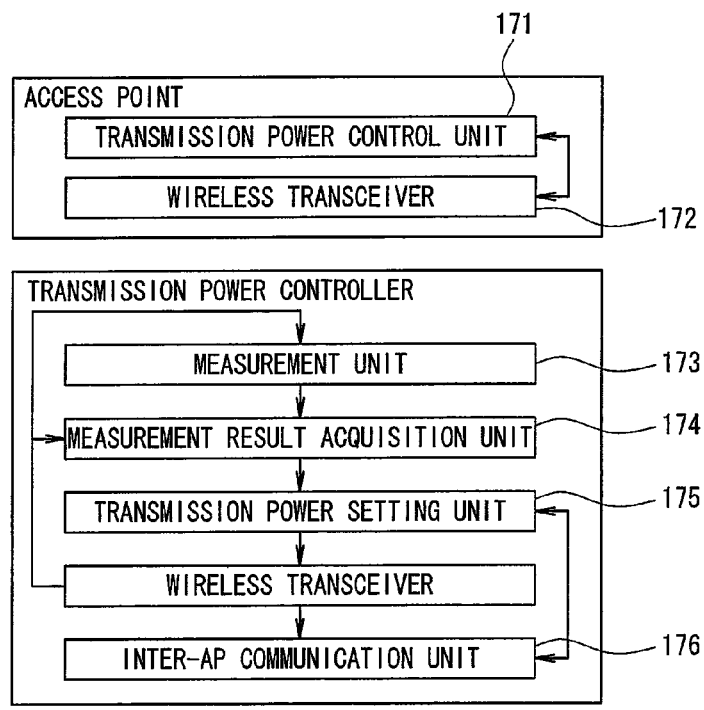
FIG. 17 is a diagram for showing the hardware configuration of an access point of the embodiment of the present invention.
Figure 18:
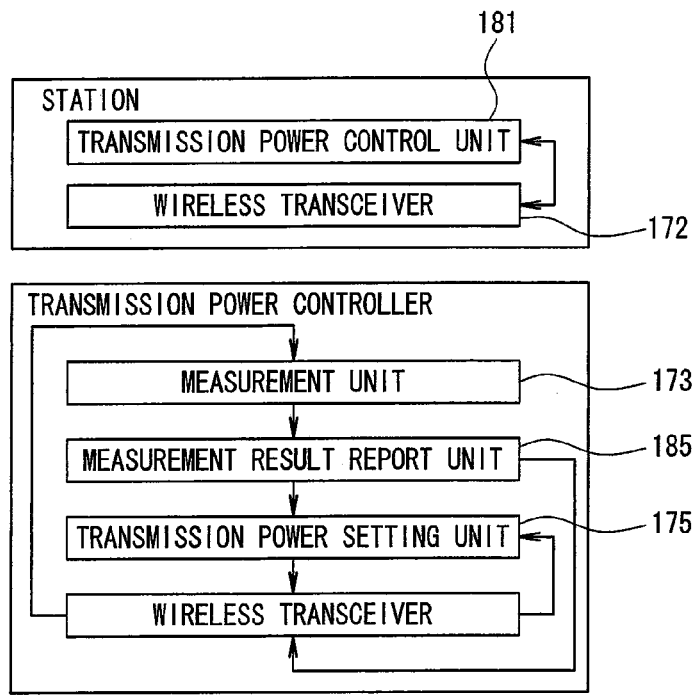
FIG. 18 is a diagram for showing the hardware configuration of a station of the embodiment of the present invention.

In addition, the configuration including the hardware of the access point of the present invention is shown in FIG. 17, and the hardware configuration of the station is shown in FIG. 18.

The access point shown in FIG. 17 is comprised of a wireless transceiver 172 and a transmission power controller 171. The wireless transceiver 172 constructs the data entered in the access point from the wired LAN into a data frame which is an IEEE 802.11 standard-compliant wireless LAN packet, and sends it through the antenna by separating the timing from other management frame and a control frame, and at the same time receives a data frame, a management frame, a control frame from other nodes through the antenna, and communicates them to the wired LAN.

The transmission power controller 171 is comprised of a measurement unit 173 for monitoring the wireless transceiver 172 to perform wireless measurement, communication quality measurement, and wireless medium usage rate measurement, a measurement result acquisition unit 174 for giving each attributed station through the wireless transceiver 172 an instruction to perform the wireless measurement, the communication quality measurement, and the wireless medium usage rate measurement to obtain the measurement result, and at the same time obtain the wireless measurement result and communication quality measurement result, and wireless medium usage rate from the measurement unit, a transmission power setting unit 175 for determining the transmission power based on the wireless measurement result and the communication quality measurement result, the wireless medium usage rate in the access point and each station attributed to the access point, and the transmission power setting situation of a neighboring AP, and setting and updating the transmission power on the access point and each station attributed thereto, and an inter-AP communication unit 175 for communicating through a wired LAN or a wireless LAN with a neighboring AP to exchange information on the setting situation and the measurement result.

In addition, the station 180 shown in FIG. 18 is comprised of a wireless transceiver 172 and a transmission power controller 181. The wireless transceiver 172 constructs the data entered in the station from the wired LAN and an information terminal into a data frame which is an IEEE 802.11 standard-compliant wireless LAN packet, and sends it through the antenna by separating the timing from other management frame and a control frame, and at the same time receives a data frame, a management frame, a control frame from other nodes through the antenna, and communicates them to the wired LAN.

The transmission power controller 181 is comprised of a measurement unit 173 for monitoring the wireless transceiver 172 to perform the wireless measurement, communication quality measurement, and wireless medium usage rate measurement, a measurement result report unit 185 for reporting the measurement result of the wireless measurement, the communication quality measurement, and the wireless medium usage rate measurement instructed by the opposite access point through the wireless transceiver, and obtaining the wireless measurement result, the communication quality measurement result, and the wireless medium usage rate from the measurement unit 173, and the transmission power setting unit 175 for setting and updating the transmission power of the station based on the wireless measurement result, the communication quality measurement result, the wireless medium usage rate in the station, and the instruction from the opposite access point.

(6) Communication Control Method

Figure 19:
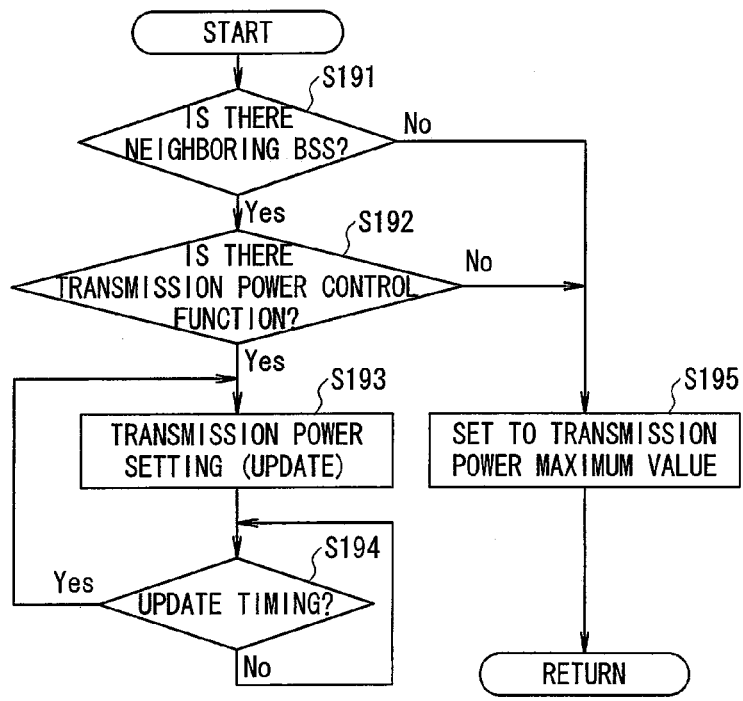
FIG. 19 is a flowchart for illustrating a transmission control method of the embodiment of the present invention.

Next, the communication control method which is performed by the communication control device of the present embodiment described above will be described. FIG. 19 is a flowchart for illustrating the communication control method of the present embodiment. In the shown flowchart, first, an access point in a BSS determines whether or not there is a neighboring BSS (S191). As a result of the determination, when there is no neighboring BSS (S191: NO), the access point sets the transmission power of its own access point and the station attributed to its own access point to the maximum value (S195).

On the other hand, when it is determined that there is a neighboring BSS (S191: Yes), the transmission power determination function in the access point determines whether or not the neighboring BSS has a control function of the transmission power (S192). Note that, whether or not the control function of the transmission power is provided can be recognized by the information or the like contained in a frame for response to the control frame sent by the access point. When there is no control function of the transmission power in the neighboring BSSs (S192: NO), the access point sets the transmission power of its own access point and the station attributed to its own access point to the maximum value (S195).

On the other hand, when there is a neighboring BSS having the control function of the transmission power (S192: Yes), the transmission power determination function sets the transmission power of its own access point and the station attributed to its own access point based on the measurement value of the signal measured by various measurement functions (S193). After setting the transmission power, the transmission power determination function 210 determines whether or not the update of the transmission power, which was set in advance to a given period, should be performed (S194).

In Step S194, when it is determined that the transmission power should be updated (S194: Yes), the transmission power is set again in Step S193, and the transmission power, which was set in advance, is updated (S193).

In the flowchart described above, Step S191 corresponds to the neighboring BSS discovery step. In addition, Step S193 corresponds to the transmission power setting step.

The present invention may be applied to wireless LANs in which an access point is fixed, and portable wireless LAN systems.

What is claimed is:

1. A communication control device that controls the transmission power of a communication device, in an infrastructure mode wireless LAN system using CSMA/CA for access control to a wireless medium, and using adaptive modulation/demodulation operation for wireless transmission, comprising:

BSS discovery means for determining, based on at least one of wireless information obtained by measurement of a wireless signal by an access point or stations which are nodes in a BSS, which is a communication group including an access point and a plurality of stations, or the wireless information reported to the access point or the stations, whether or not there is a neighboring BSS, which is a BBS having a plurality of nodes, in which sending of a wireless signal by the plurality of nodes influences the communication of the access point or the stations; and transmission power setting means for setting the transmission power of the access point and each of the stations based on the result of the determination by the BSS discovery means, wherein, if it is determined by the BSS discovery means that there is a neighboring BSS, when all the access points constituting the neighboring BBS have the control function of the transmission power, the transmission power setting means sets the transmission power between the access point and each of the stations in its own BSS, which is a BSS including the transmission power setting means, and repeatedly updates the transmission power which is set every time the defined condition is satisfied, and, if there is an access point in the neighboring BSS that does not control the transmission power and if there is no neighboring BSS, maximizes the transmission power.

2. The communication control device according to claim 1, wherein the transmission power setting means sets transmission power common to the access point and the stations when setting the transmission power of the access point and each of the stations in its own BSS.

3. The communication control device according to claim 2, wherein the transmission power setting means in the access point sets as the lower limit of transmission power control range, the transmission power whereby the farthest station from the access point in its own BSS sends a packet at the slowest data transmission speed and the packet obtains a defined quality at the access point, and determines the upper limit of transmission power control range by the maximum transmission power information contained in at least one of a beacon signal which is a management frame which the access point periodically sends out to all the stations in the BSS, a pilot signal for wireless resource measurement, or a management frame for response use sent back from the access point where the station performed attribution processing.

4. The communication control device according to claim 2, wherein the transmission power setting means sets different transmission power for each management frame, data frame, and control frame, which are packet types defined in the wireless LAN.

5. The communication control device according to claim 2, wherein the transmission power setting means sets and updates, at the access point, the transmission power of the access point, and notifies the station contained in the BSS of the set transmission power, or gives the station an instruction to set or update the transmission power.

6. The communication control device according to claim 2, wherein the transmission power setting means initializes the transmission power as an absolute value, and performs update by increasing and reducing the transmission power set immediately before, directly with a value relative to the setting value immediately before and the setting value after update, or in a step unit defined for transmission power update.

7. The communication control device according to claim 1, wherein the transmission power setting means sets different transmission power for each management frame, data frame, and control frame, which are packet types defined in the wireless LAN.

8. The communication control device according to claim 1, wherein the transmission power setting means sets and updates, at the access point, the transmission power of the access point, and notifies the station contained in the BSS of the set transmission power, or gives the station an instruction to set or update the transmission power.

9. The communication control device according to claim 8, wherein the transmission power setting means in the access point mutually communicates to an access point constituting the neighboring BSS, at least one of the wireless information obtained by measurement, the wireless information reported from the station to its own BSS, and information related to transmission power which is currently set.

10. The communication control device according to claim 8, wherein the transmission power setting means in the access point increases the transmission power by a defined step when the wireless medium usage rate due to communication with the station attributed to the access point exceeds a first wireless medium usage rate threshold, and reduces the transmission power by a defined step when the wireless medium usage rate falls below a second wireless medium usage rate threshold smaller than the first wireless medium usage rate threshold.

11. The communication control device according to claim 10, wherein the transmission power setting means performs a shift-up, which increases the data transmission speed to be set, on a node for which, as a result of the control of the transmission power, the data frame communication quality is smaller than a first quality specification value, that is to say, determined to be good, and performs a shift-down, which reduces the data transmission speed to be set, on a node for which the data frame communication quality is larger than a second quality specification value, that is to say, determined to be bad, the first quality specification value being smaller than the second quality specification value, and the update period of the data transmission speed being smaller than the update period of the transmission power.

12. The communication control device according to claim 10, wherein the transmission power setting means in the access point increases a first wireless medium usage rate threshold and a second wireless medium usage rate threshold when at least one of the packet transmission delay amount measurement results by the access point and the station attributed thereto is smaller than a packet transmission delay amount target value, and reduces the first wireless medium usage rate threshold and the second wireless medium usage rate threshold when the packet transmission delay amount measurement result is larger than the packet transmission delay amount target value, the update period of the wireless medium usage rate threshold being larger than the update period of the transmission power.

13. The communication control device according to claim 1, wherein the transmission power setting means initializes the transmission power as an absolute value, and performs update by increasing and reducing the transmission power set immediately before, directly with a value relative to the setting value immediately before and the setting value after update, or in a step unit defined for transmission power update.

14. The communication control device according to claim 1, wherein that the wireless information is information including at least one of a wireless measurement result which is a result obtained by measuring at least one of transmission power in a BSS operating frequency band, total received power, noise power other than during packet sending/receiving, signal power during packet receiving, a signal power to noise power ratio during packet receiving, propagation loss to the opposite station or access point, or the number of connection stations or visible access points, a communication quality measurement result obtained by measuring at least one of a packet collision occurrence rate, a packet retransmission occurrence rate, or a packet error rate, or a wireless medium usage rate, which indicates the percentage of packet sending/receiving time in specified observation time, and at least one of the wireless measurement result, the communication quality measurement result, and the wireless medium usage rate is an average value or statistics within a given length of time.

15. The communication control device according to claim 14, wherein the noise power obtained as a result of the wireless measurement is a value including interference power.

16. The communication control device according to claim 14, wherein, when the access point periodically sends at least one of a beacon signal, which is a management frame sent to all the stations in its own BSSs and includes transmission power information of the frame, or a pilot signal for wireless resource measurement, and the station, which is about to attribute itself to the access point, receives the beacon signal or the pilot signal, the transmission power setting means evaluates the propagation loss between the access point and the station based on the power of the received signal at the station and the transmission power information, and sets the initial value of the transmission power of the management frame, which is sent out by the station to attribute itself to the access point so that the transmission power of the management frame sent by the station obtains the specified received signal power at the access point.

17. The communication control device according to claim 16, wherein, if a management frame responding to the management frame sent out by the station to the access point is not sent back to the station even after a predetermined time has elapsed, the transmission power setting means increases by a defined step transmission power in the next attribution processing by the station.

18. The communication control device according to one of claim 16, wherein the transmission power setting means sets the initial setting value of the transmission power of the management frame, the data frame, and the control frame other than for the attribution processing of the station to a value obtained by multiplying the setting value of the transmission power at the time of successful transmission of the management frame for attribution processing by the ratio of the initial transmission speed for each predetermined frame type and the transmission speed of the management frame for attribution processing.

19. The communication control device according to claim 14, wherein, when the access point periodically sends at least one of a beacon signal, which is a management frame sent to all the stations in its own BSSs and includes transmission power information of the frame and noise power information of a frame to be sent, or a pilot signal for wireless resource measurement, and the station, which is about to attribute itself to the access point, receives the beacon signal or the pilot signal, the transmission power setting means sets, based on the noise information measured by the station, the initial value of the transmission power of the management frame, which is sent out by the station to attribute itself to the access point so that the transmission power of the management frame sent by the station obtains the received signal power having a specified signal power to noise power ratio at the access point.

20. A communication control method that controls the transmission power of a communication device, in an infrastructure mode wireless LAN system using CSMA/CA for access control to a wireless medium, and using adaptive modulation/demodulation operation for wireless transmission, comprising:
a BSS discovery step for determining, based on at least one of wireless information obtained by measurement of a wireless signal by an access point or stations which are nodes in a BSS, which is a communication group including an access point and a plurality of stations, or the wireless information reported to the access point or the stations, whether or not there is a neighboring BSS, which is a BBS having a plurality of nodes, in which sending of a wireless signal by the plurality of nodes influences the communication of the access point or the stations, and;
a transmission power setting step for setting the transmission power of the access point and each of the stations based on the result of the determination by the BSS discovery step,
wherein, if it is determined by the BSS discovery step that there is a neighboring BSS, when all the access points constituting the neighboring BBS have the control function of the transmission power, the transmission power setting step sets the transmission power between the access point and each of the stations in its own BSS, which is a BSS where the transmission power setting step is performed, and repeatedly updates the transmission power which is set every time the defined condition is satisfied, and, if there is an access point in the neighboring BSS that does not control the transmission power and if there is no neighboring BSS, maximizes the transmission power.

* * * * *